US012214600B2

(12) United States Patent
Kohda et al.

(10) Patent No.: US 12,214,600 B2
(45) **Date of Patent: *Feb. 4, 2025**

(54) LIQUID DISCHARGING HEAD, LIQUID DISCHARGING UNIT, AND DEVICE FOR DISCHARGING LIQUID

(71) Applicant: Ricoh Company, Ltd., Tokyo (JP)

(72) Inventors: Tomohiko Kohda, Ibaraki (JP); Takahiro Yoshida, Ibaraki (JP); Shiomi Andou, Kanagawa (JP); Takayuki Nakai, Kanagawa (JP); Kanshi Abe, Ibaraki (JP); Takeshi Shimizu, Kanagawa (JP); Ryo Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,518

(22) Filed: Jun. 21, 2023

(65) Prior Publication Data

US 2023/0330999 A1 Oct. 19, 2023

Related U.S. Application Data

(63) Continuation of application No. 17/660,705, filed on Apr. 26, 2022, now Pat. No. 11,724,514, which is a (Continued)

(30) Foreign Application Priority Data

Jan. 6, 2015 (JP) ................................ 2015-000612
May 11, 2015 (JP) ................................ 2015-096721

(51) Int. Cl.

| | |
|---|---|
| ***B41J 2/18*** | (2006.01) |
| ***B41J 2/14*** | (2006.01) |
| ***B41J 2/175*** | (2006.01) |

(52) U.S. Cl.

CPC ............ *B41J 2/18* (2013.01); *B41J 2/14104* (2013.01); *B41J 2/14274* (2013.01); *B41J 2/175* (2013.01);

(Continued)

(58) Field of Classification Search

CPC ...... B41J 2/18; B41J 2/14104; B41J 2/14274; B41J 2/175; B41J 2/17509; B41J 2/17563;

(Continued)

(56) References Cited

U.S. PATENT DOCUMENTS 5,455,615 A 10/1995 Burr et al.
8,567,921 B2 10/2013 Yoshida et al.

(Continued)

FOREIGN PATENT DOCUMENTS

CN 102092192 6/2011
EP 2316649 5/2011

(Continued)

OTHER PUBLICATIONS

International Search Report Issued on Mar. 15, 2016 in PCT/JP2015/085574 filed on Dec. 18, 2015.

(Continued)

*Primary Examiner* — Geoffrey S Mruk
(74) *Attorney, Agent, or Firm* — IPUSA, PLLC

(57) ABSTRACT

A liquid discharging head includes a nozzle plate having a plurality of nozzles from which liquid is discharged; a plurality of individual liquid chambers that are communicably connected to the plurality of nozzles, respectively; a common liquid chamber that supplies liquid to the plurality of individual liquid chambers; and a circulation common liquid chamber that leads to a plurality of circulation channels. A part of the common liquid chamber overlaps the circulation common liquid chamber from a direction in (Continued)

which liquid is discharged from the nozzles, and another part of the common liquid chamber overlaps the circulation common liquid chamber from a direction orthogonal to both the direction in which liquid is discharged from the nozzles and a direction in which the nozzles are aligned.

18 Claims, 28 Drawing Sheets

Related U.S. Application Data continuation of application No. 16/881,276, filed on May 22, 2020, now Pat. No. 11,420,447, which is a continuation of application No. 16/695,790, filed on Nov. 26, 2019, now Pat. No. 10,696,057, which is a continuation of application No. 16/191,912, filed on Nov. 15, 2018, now Pat. No. 10,538,101, which is a continuation of application No. 15/638,724, filed on Jun. 30, 2017, now Pat. No. 10,160,226, which is a continuation of application No. PCT/JP2015/085574, filed on Dec. 18, 2015.

(52) U.S. Cl.
CPC ....... *B41J 2/17509* (2013.01); *B41J 2/17563* (2013.01); *B41J 2002/14403* (2013.01); *B41J 2002/14419* (2013.01); *B41J 2202/07* (2013.01); *B41J 2202/11* (2013.01); *B41J 2202/12* (2013.01)

(58) Field of Classification Search
CPC .... B41J 2002/14403; B41J 2002/14419; B41J 2202/07; B41J 2202/11; B41J 2202/12
See application file for complete search history.

(56) References Cited

U.S. PATENT DOCUMENTS

| | | | | |
|---|---|---|---|---|
| 8,899,724 | B2 | 12/2014 | Akahane et al. | |
| 9,096,061 | B2 | 8/2015 | Sasaki | |
| 9,272,514 | B2 | 3/2016 | Nishimura et al. | |
| 10,160,226 | B2 * | 12/2018 | Kohda | B41J 2/17509 |
| 10,696,057 | B2 | 6/2020 | Kohda et al. | |
| 11,420,447 | B2 * | 8/2022 | Kohda | B41J 2/17509 |
| 11,724,514 | B2 * | 8/2023 | Kohda | B41J 2/17563 347/47 |
| 2002/0167569 | A1 | 11/2002 | Hosono et al. | |
| 2010/0201756 | A1 | 8/2010 | Kuwajima et al. | |
| 2010/0328409 | A1 | 12/2010 | Matsufuji et al. | |
| 2011/0007117 | A1 | 1/2011 | Bibl et al. | |
| 2011/0102519 | A1 | 5/2011 | Koseki | |
| 2011/0148988 | A1 | 6/2011 | Hoisington et al. | |
| 2012/0182354 | A1 | 7/2012 | Akahane et al. | |
| 2013/0208059 | A1 | 8/2013 | Arimoto | |
| 2019/0084313 | A1 | 3/2019 | Kohda et al. | |
| 2020/0282740 | A1 | 9/2020 | Kohda et al. | |

FOREIGN PATENT DOCUMENTS

| | | |
|---|---|---|
| GB | 2504777 | 2/2014 |
| JP | H06-115087 | 4/1994 |
| JP | H09-011496 | 1/1997 |
| JP | H10-076650 | 3/1998 |
| JP | 2003-260796 | 9/2003 |
| JP | 2004-098310 | 4/2004 |
| JP | 2008-290292 | 12/2008 |
| JP | 2010-179631 | 8/2010 |
| JP | 2011-025663 | 2/2011 |
| JP | 2012-061717 | 3/2012 |
| JP | 2012-143948 | 8/2012 |
| JP | 2012-143980 | 8/2012 |
| JP | 5029395 | 9/2012 |
| JP | 2014-054844 | 3/2014 |
| JP | 2014-162160 | 9/2014 |
| JP | 2015-071289 | 4/2015 |

OTHER PUBLICATIONS

Extended European Search Report for 15877020.6 mailed on Dec. 8, 2017.
Office Action dated Feb. 2, 2018 issued with respect to the corresponding Chinese Patent Application No. 201580072266.X.
Japanese Office Action for 2021-021494 mailed on Jan. 11, 2022.

* cited by examiner

LIQUID DISCHARGING HEAD, LIQUID DISCHARGING UNIT, AND DEVICE FOR DISCHARGING LIQUID

CROSS-REFERENCE TO RELATED APPLICATIONS

The present application is a continuation application of and claims the benefit of priority under 35 U.S.C. 120 of U.S. patent application Ser. No. 17/660,705, now issued as U.S. Pat. No. 11,724,514, which was filed on Apr. 26, 2022, and which is a continuation application of and claims the benefit of priority under 35 U.S.C. 120 of U.S. patent application Ser. No. 16/881,276, now issued as U.S. Pat. No. 11,420,447, which was filed on May 22, 2020, and is a continuation application of and claims the benefit of priority under 35 U.S.C. 120 of U.S. patent application Ser. No. 16/695,790, now issued as U.S. Pat. No. 10,696,057, which was filed on Nov. 26, 2019, and is a continuation application of and claims the benefit of priority under 35 U.S.C. 120 of U.S. patent application Ser. No. 16/191,912, now issued as U.S. Pat. No. 10,538,101, which was filed on Nov. 15, 2018, and is a continuation application of and claims the benefit of priority under 35 U.S.C. 120 of U.S. patent application Ser. No. 15/638,724, now issued as U.S. Pat. No. 10,160,226, which was filed on Jun. 30, 2017, and is a continuation application of and claims the benefit of priority under 35 U.S.C. 120 and 365 (c) of International Application No. PCT/JP2015/085574, filed Dec. 18, 2015, which claims priority to Japanese Patent Applications No. 2015-000612 filed on Jan. 6, 2015 and No. 2015-096721 filed on May 11, 2015. The contents of the applications are incorporated herein by reference in their entirety.

BACKGROUND OF THE INVENTION

1. Field of the Invention

The present disclosure relates to liquid discharging heads, liquid discharging units, and devices for discharging liquid.

2. Description of the Related Art

As a liquid discharging head (also referred to as a droplet discharging head) for discharging liquid, a circulation-type head that circulates liquid through multiple individual liquid chambers is known in the art.

For example, according to a known technique, a common liquid chamber for supplying liquid to each of individual liquid chambers (i.e., pressure generating chambers) and a circulation common liquid chamber that leads to a circulation channel that leads to each of the individual liquid chambers are formed of a channel member including multiple plate members for fabricating each of the individual liquid chambers (i.e., pressure generating chambers) and circulation channels (cf. Japanese Unexamined Patent Application Publication No. 2008-290292).

SUMMARY OF THE INVENTION

One aspect of the present invention provides a liquid discharging head including a nozzle plate having a plurality of nozzles from which liquid is discharged; a plurality of individual liquid chambers that are communicably connected to the plurality of nozzles, respectively; a common liquid chamber that supplies liquid to the plurality of individual liquid chambers; and a circulation common liquid chamber that leads to a plurality of circulation channels, wherein a part of the common liquid chamber overlaps the circulation common liquid chamber from a direction in which liquid is discharged from the nozzles, and another part of the common liquid chamber overlaps the circulation common liquid chamber from a direction orthogonal to both the direction in which liquid is discharged from the nozzles and a direction in which the nozzles are aligned.

DESCRIPTION OF THE EMBODIMENTS

Here, ensuring dimensional accuracy to a predetermined extent is necessary because dimension of a channel including an individual liquid chamber affects discharging quality.

Therefore, in a case where a circulation common liquid chamber is formed of a channel member for forming an individual liquid chamber as disclosed in Japanese Unexamined Patent Application Publication No. 2008-290292, dimension (or size) of the circulation common liquid chamber is restricted in accordance with dimension of the individual liquid chamber.

The present invention, which has been made in consideration of the above problem, aims to provide a liquid discharging head, a liquid discharging unit, and a device for discharging liquid, by which restriction against a circulation common liquid chamber can be effectively reduced.

The present invention enables to provide a liquid discharging head, a liquid discharging unit, and a device for discharging liquid, by which a circulation common liquid chamber can be effectively reduced.

The following description explains embodiments of the present invention with reference to accompanying drawings.

First Embodiment

Figure 1:
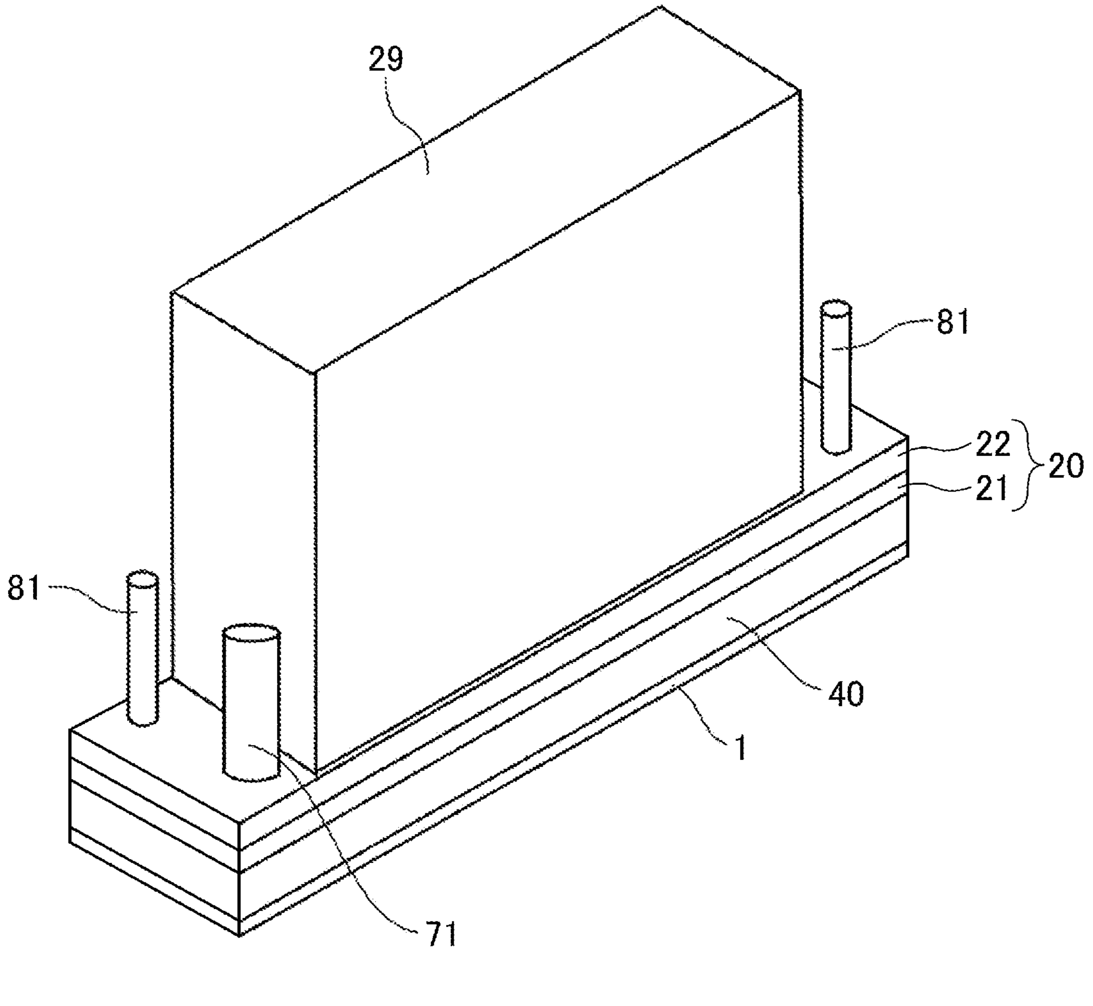
FIG. 1 is a perspective view of external appearance of an example of a liquid discharging head according to a first embodiment of the present invention.
Figure 2A:
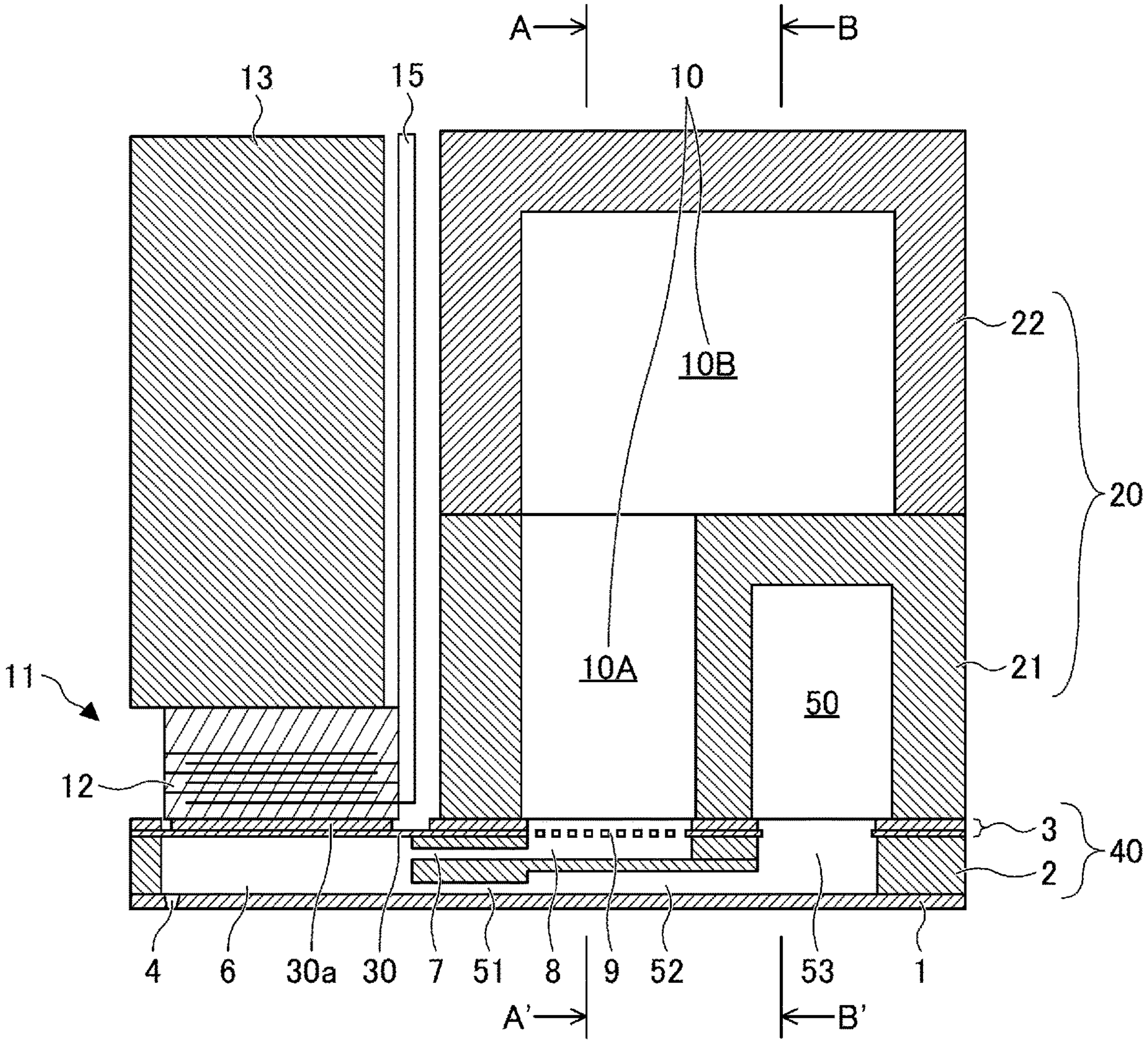
FIG. 2A is a cross-sectional view of a part of an example of the liquid discharging head, which is viewed from a direction (i.e., a transverse direction of a liquid chamber) orthogonal to a direction in which nozzles are aligned.
Figure 2B:
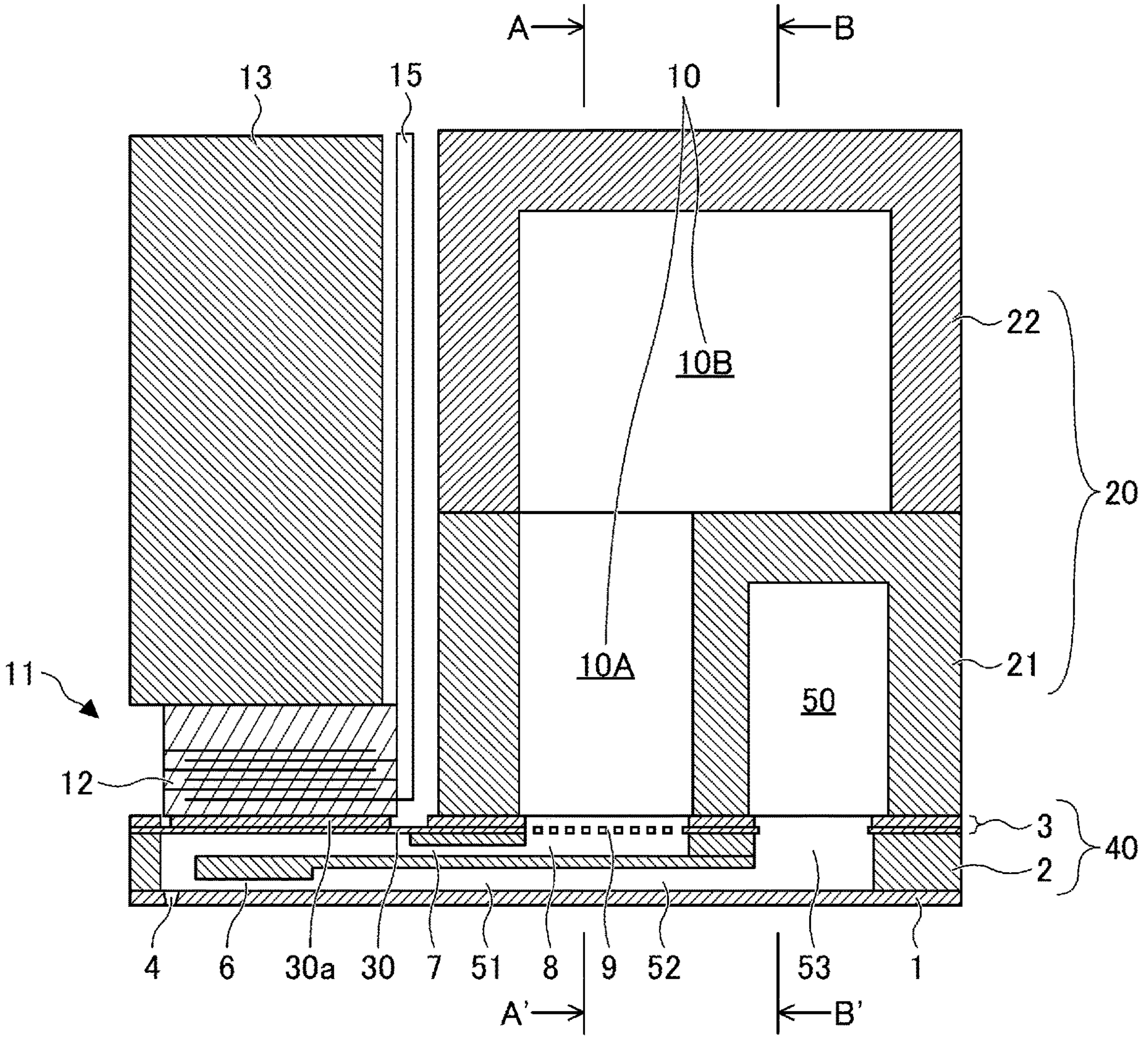
FIG. 2B is a cross-sectional view of a part of an example of the quid discharging head, which is viewed from the direction (i.e., the transverse direction of a liquid chamber) orthogonal to the direction in which the nozzles are aligned.
Figure 3:
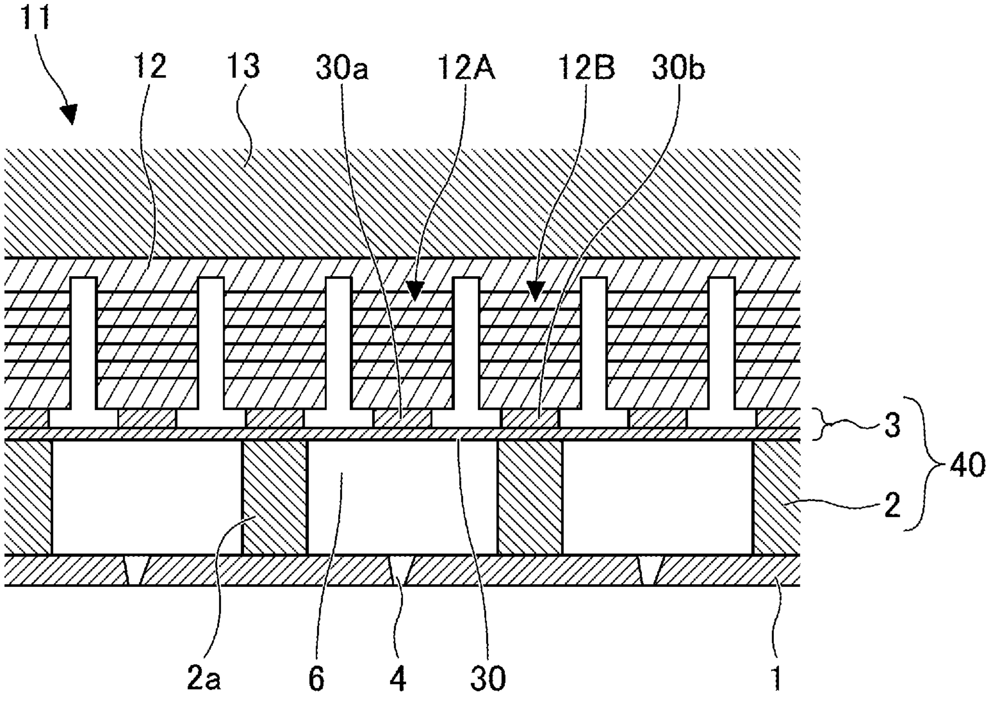
FIG. 3 is a cross-sectional view of a part of the examples of the liquid discharging head as illustrated in FIGS. 2A and 2B, which is viewed from a direction (i.e., longitudinal direction of a liquid chamber) parallel to the direction in which the nozzles are aligned.

The following description explains an example of a liquid discharging head according to the first embodiment of the present invention with reference to FIG. 1 through FIG. 3.

FIG. 1 is a perspective view of external appearance of the example of the liquid discharging head. FIG. 2A is a cross-sectional view of a part of an example of the liquid discharging head, which is viewed from a direction (i.e., a transverse direction of a liquid chamber) orthogonal to a direction in which the nozzles are aligned. FIG. 3 is a cross-sectional view of a part of the example of the liquid discharging head, which is viewed from a direction (i.e., longitudinal direction of a liquid chamber) parallel to the direction in which the nozzles are aligned.

Figure 4A:
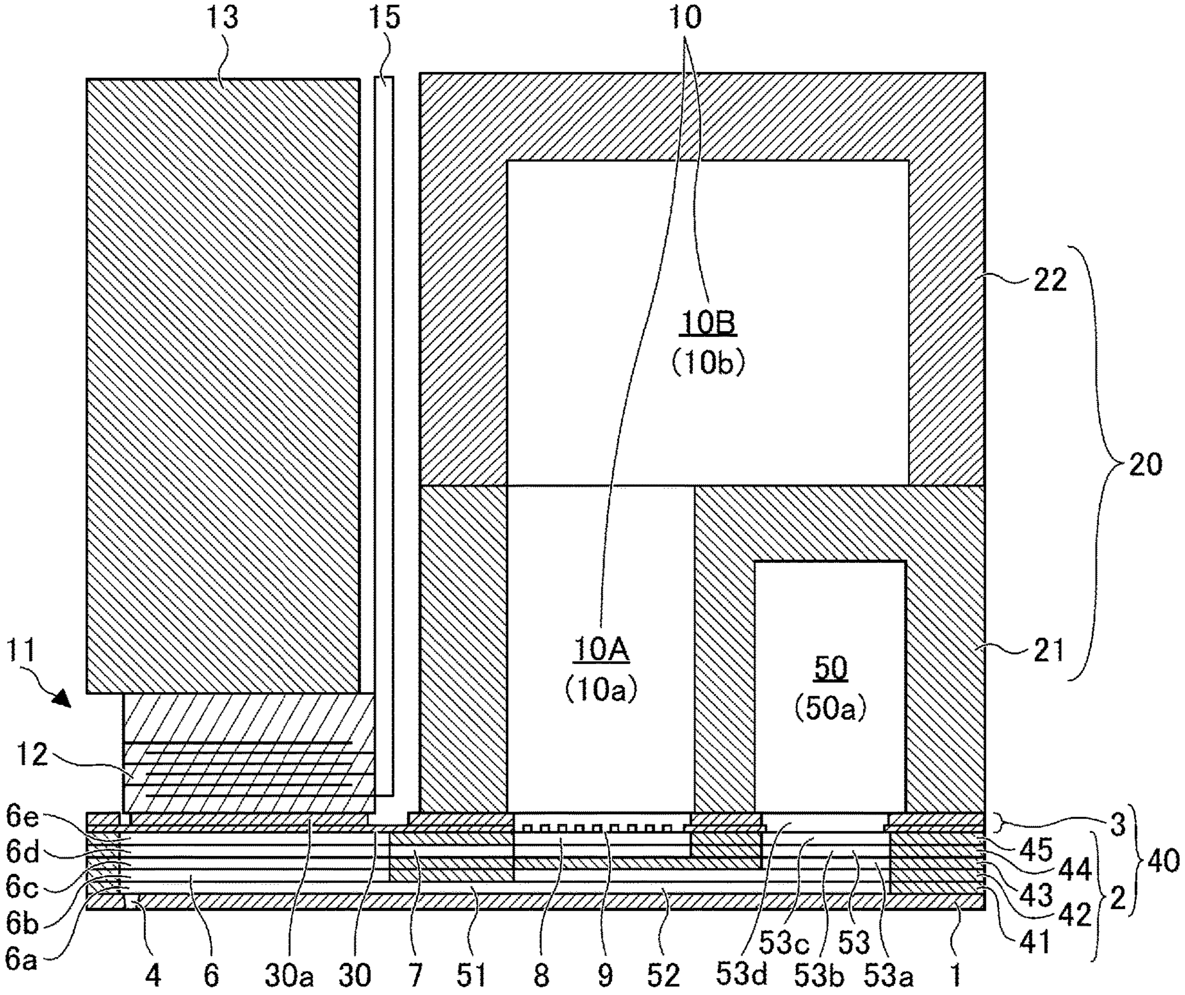
FIG. 4A is a cross-sectional view of a part of an example of a liquid discharging head according to a second embodiment of the present invention, which is viewed from the direction (i.e., the transverse direction of a liquid chamber) orthogonal to the direction in which the nozzles are aligned.
Figure 14A:
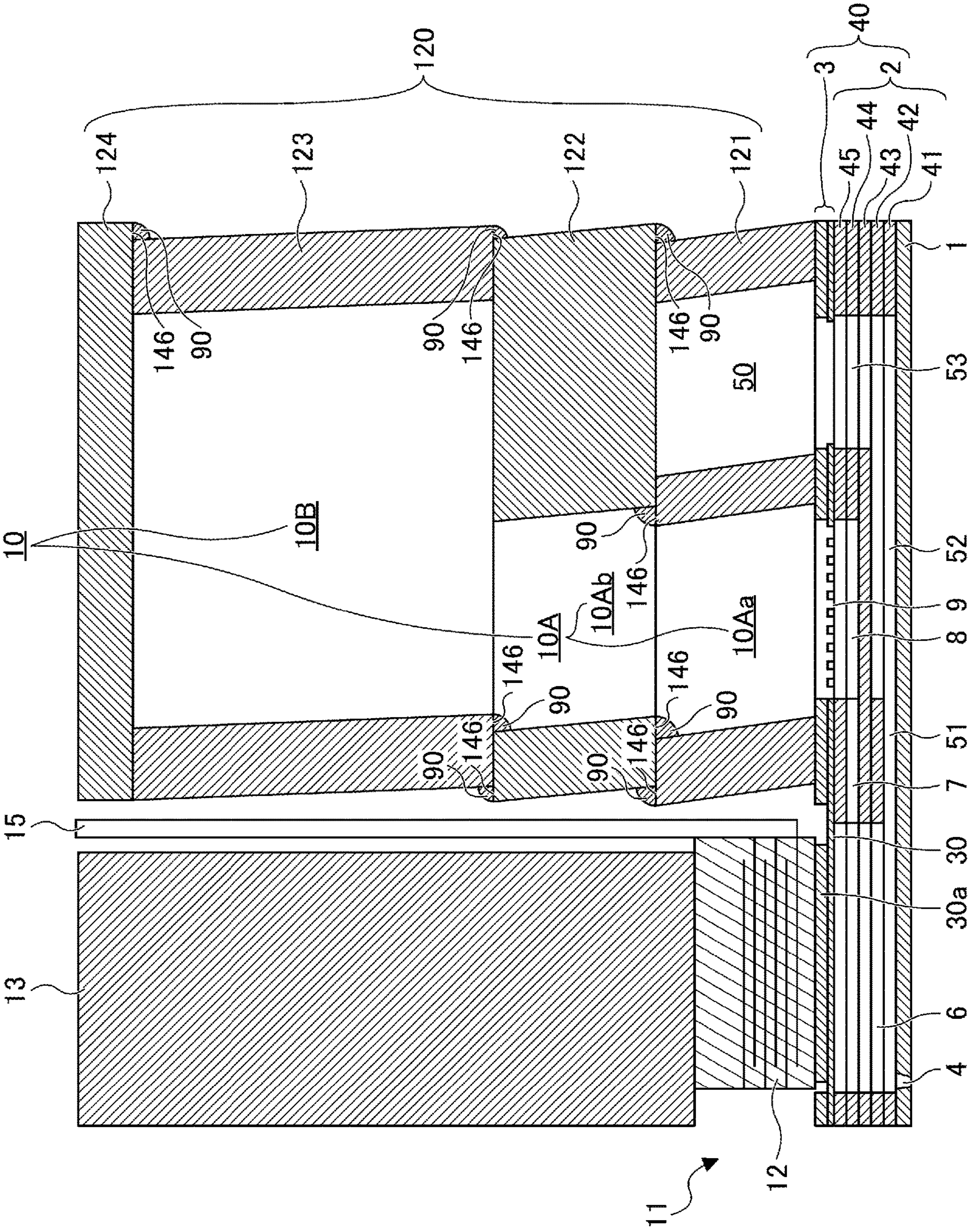
FIG. 14A is a cross-sectional view of a part of an example of a liquid discharging head according to a seventh embodiment of the present invention, which is viewed from the direction (i.e., the transverse direction of a liquid chamber) orthogonal to the direction in which the nozzles are aligned.
Figure 15A:
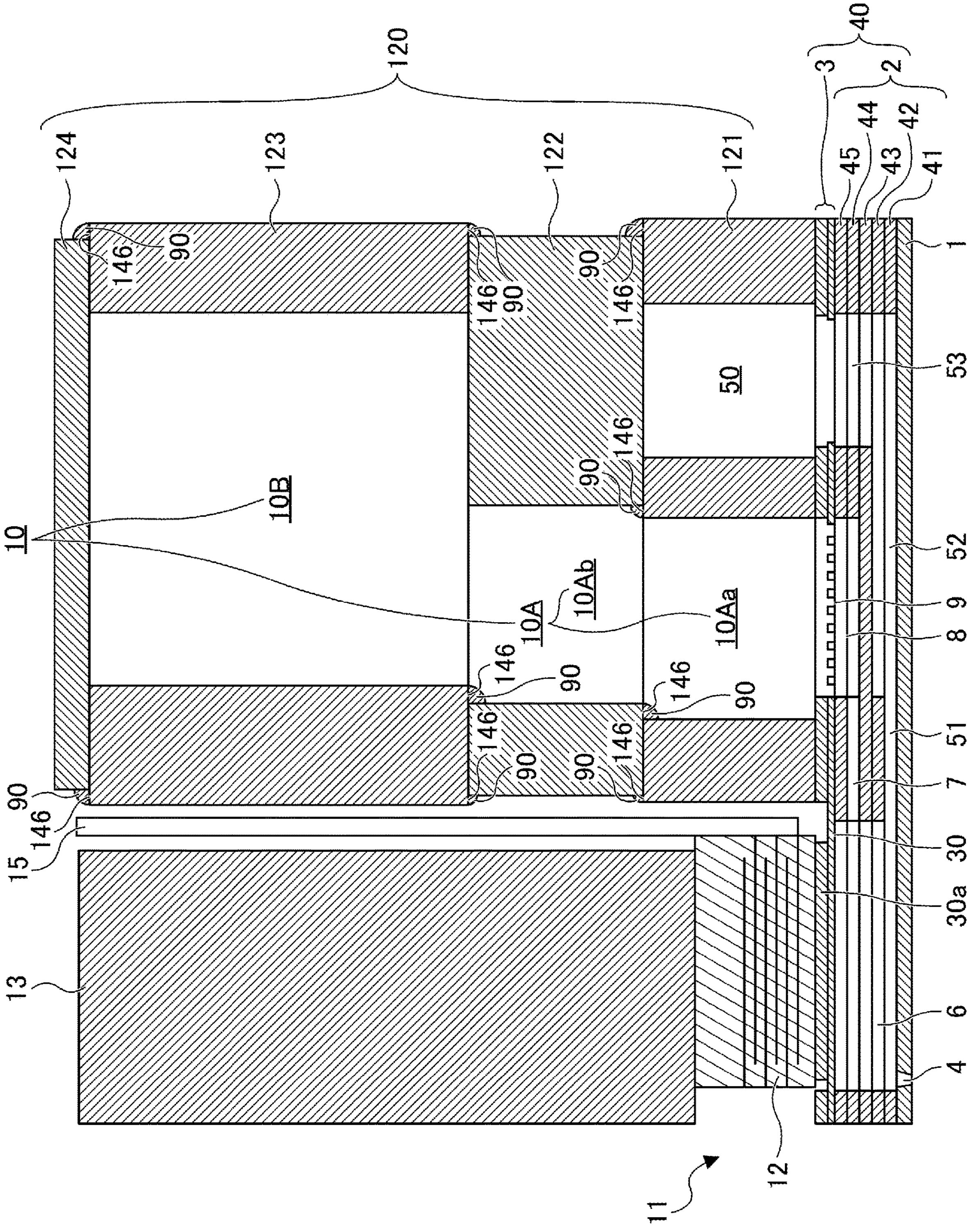
FIG. 15A is a cross-sectional view of a part of an example of a liquid discharging head according to an eighth embodiment of the present invention, which is viewed from the direction (i.e., the transverse direction of a liquid chamber) orthogonal to the direction in which the nozzles are aligned.

The part of the liquid discharging head illustrated in FIG. 2A is one side (i.e., the right side, in FIG. 2A) of the liquid discharging head, which is formed along the direction orthogonal to the direction in which the nozzles are aligned. That is to say, in actuality, the liquid discharging head has another side (i.e., the left side) configured to be symmetrical or almost symmetrical with respect to the surface orthogonal to the paper surface of FIG. 2A, such that the said another side is formed to be joined with the part illustrated in FIG. 2A. FIG. 4A, FIG. 14A, and FIG. 15A also have similar configurations.

Figure 20:
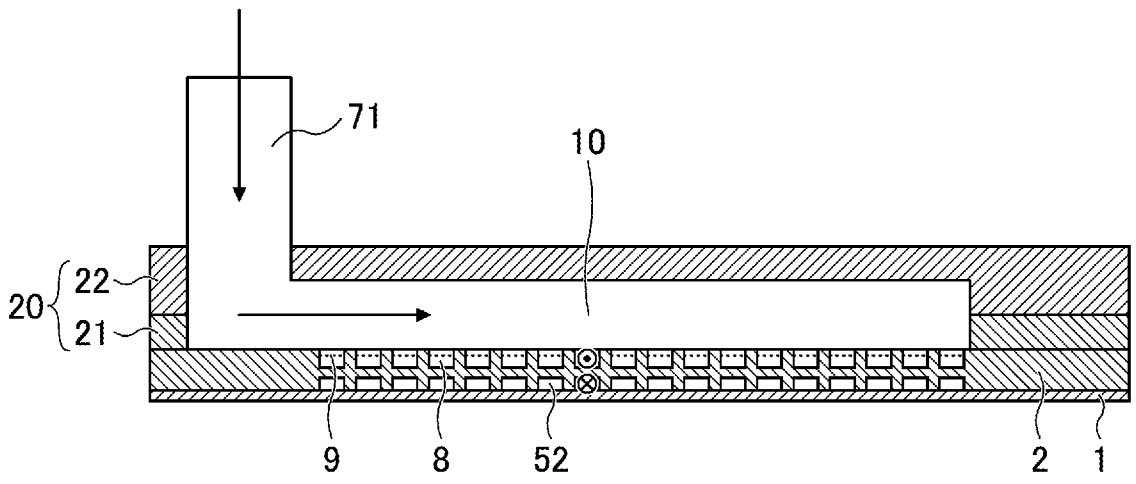
FIG. 20 is a cross-sectional view taken along A-A' in each of FIGS. 2A and 2B.
Figure 21:
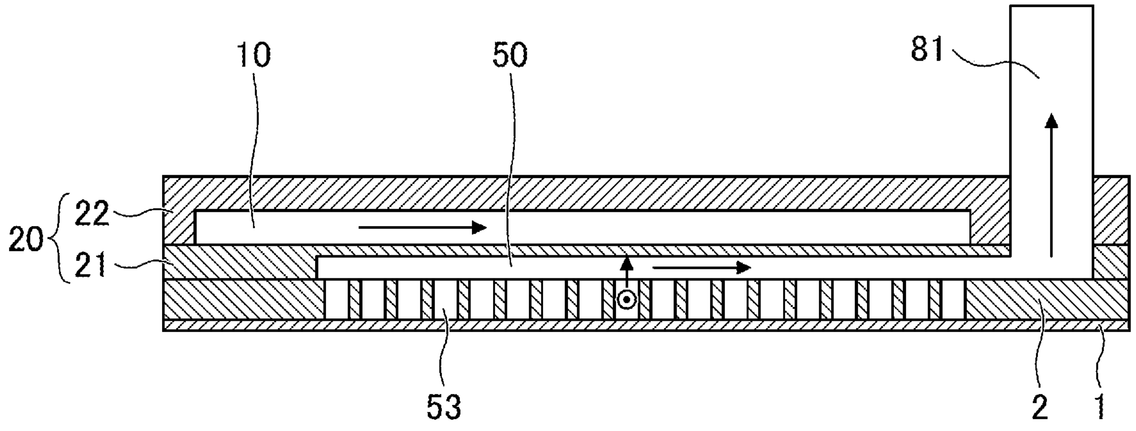
FIG. 21 is a cross-sectional view taken along B-B' in each of FIGS. 2A and 2B.

Furthermore, FIG. 20 is a cross-sectional view taken along A-A' illustrated in each of FIGS. 2A and 2B. FIG. 21 is a cross-sectional view taken along B-B' illustrated in FIGS. 2A and 2B. The liquid discharging head includes a nozzle plate 1, a channel plate 2, and a diaphragm member 3 as a wall surface member, which are joined to form layers. The liquid discharging head further includes a piezoelectric actuator 11 for causing displacement of the diaphragm member 3, a common liquid chamber member 20, and a cover 29. Note that illustration of the cover 29 is omitted in each of the drawings following FIG. 2A, for convenience explanation.

The nozzle plate 1 includes multiple nozzles 4 from which liquid is discharged.

In the channel plate 2, there are individual liquid chambers 6 that lead to the nozzles 4, respectively, fluid resistance portions 7 that lead to the individual liquid chambers 6, respectively, and a liquid introduction portion (i.e., channel) 8 that leads to the fluid resistance portions 7.

The diaphragm member 3 includes filter portions 9 as openings, through which the liquid introduction portion 8 and a common liquid chamber 10 formed in the common liquid chamber member 20 are connected.

The diaphragm member 3 is a wall surface member which is formed to be a wall surface of individual liquid chambers 6 of the channel plate 2. The diaphragm member 3 is configured to have a two-layer structure, which is simply an example and the diaphragm member 3 is not limited to have the structure. The diaphragm member 3 includes the first layer formed as a thin portion, which is arranged closer to the channel plate 2, and the second layer formed as a thick portion. Deformable vibration areas 30 are formed on the first layer at sections that correspond to the individual liquid chamber 6, respectively.

Furthermore, the piezoelectric actuator 11, which includes an electro-mechanical conversion element as a driving unit (i.e., an actuator unit or a pressure generating unit) for deforming the vibration areas 30 of the diaphragm member 3, is disposed on a surface of the diaphragm member 3 opposite to the individual liquid chambers 6.

The piezoelectric actuator 11 includes a piezoelectric member 12 that is joined to a base member 13. Further, the piezoelectric member 12 is in a comb-teeth shape, having a desired number of pillar-shaped piezoelectric elements 12A and 12B that are formed at predetermined intervals in grooving by means of half-cut dicing (cf. FIG. 3).

The piezoelectric element 12A of the piezoelectric member 12 is driven in accordance with application of a driving waveform, and the piezoelectric element 12B of the piezoelectric member 12 is simply used as a support to which no driving waveform is applied. However, aside from the above example, all of the piezoelectric elements 12A and 12B may be used as piezoelectric elements that are driven by driving waveforms.

The piezoelectric element 12A is joined to a convex portion 30*a*, which is an island-shaped thick portion formed on a vibration area 30 of the diaphragm member 3 (cf. FIG. 3). Further, the piezoelectric element 12B is joined to a convex portion 30*b* which is a thick portion formed on the diaphragm member 3.

The piezoelectric member 12 includes piezoelectric layers and internal electrodes that are alternately disposed to form layers. Further, the internal electrodes are drawn out of an end surface to form external electrodes, to which a flexible wiring member 15 is connected (cf. FIG. 2A).

The common liquid chamber member 20 includes the common liquid chamber 10 to which liquid is supplied from a supply tank and a main tank, which are described below with reference to FIG. 22, and includes the circulation common liquid chamber 50.

Furthermore, in a channel member 40, which includes the channel plate 2 and the diaphragm member 3, there is a fluid resistance portion 51, which is formed along the surface of the channel plate 2, that leads to each of individual liquid chambers 6; a circulation channel 52; and a circulation channel 53, which is formed along the thickness direction of the channel member 40, that leads to the circulation channel 52. The circulation channel 53 leads to the circulation common liquid chamber 50.

As the liquid discharging head is provided with such a configuration as described above, for example, when voltage applied to a piezoelectric element 12A is decreased to be lower than a reference voltage, which causes the piezoelectric element 12A to contract, a vibration area 30 of the diaphragm member 3 is elevated, such that an individual liquid chamber 6 is enlarged in volume. Consequently, liquid flows into the individual liquid chamber 6 (cf. FIG. 3).

Then, voltage applied to the piezoelectric element 12A is increased in order to extend the piezoelectric element 12A in the layering direction, so that the vibration area 30 of the diaphragm member 3 is deformed in the direction towards a nozzle 4 to compress the individual liquid chamber 6 in volume. Consequently, liquid inside the individual liquid chamber 6 is pressured and discharged from the nozzle 4.

Then, when voltage applied to the piezoelectric element 12A is returned to the reference voltage, the vibration area 30 of the diaphragm member 3 returns to the original position, such that the individual liquid chamber 6 expands to generate negative pressure. Consequently, the individual liquid chamber 6 is replenished with liquid from the common liquid chamber 10. After vibration of a meniscus surface of the nozzle 4 is attenuated to a stable state, operation for the next liquid discharge is started.

Noted that the method of driving the liquid discharging head is not limited to the above example (i.e., what may be termed a "pull to push discharge" method); what is termed a "pull discharge" method or a "push discharge" method may be used, by changing the way of applying a drive waveform.

Next, the following description explains a part that relates to a common liquid chamber and a circulation common liquid chamber of the liquid discharging head.

According to the first embodiment, as described above, the channel member 40 includes the channel plate 2 and the diaphragm member 3 formed as a wall surface member.

Further, the common liquid chamber member includes a first common liquid chamber member 21 and a second common liquid chamber member 22. The first common liquid chamber member 21 is joined to the diaphragm member 3 of the channel member 40. Further, the second common liquid chamber member 22 is joined to the upper part of the first common liquid chamber member 21, as illustrated in FIG. 2A, to form layers.

The first common liquid chamber member 21 includes a downstream common liquid chamber 10A, which is a part of the common liquid chamber 10, that leads to the liquid introduction portion 8 and includes a circulation common liquid chamber 50 that leads to the circulation channel 53. The second common liquid chamber member 22 includes an upstream common liquid chamber 10B, which is the remainder of the common liquid chamber 10.

The downstream common liquid chamber 10A, which is a part of the common liquid chamber 10, and the circulation common liquid chamber 50 are arranged side by side in the direction (i.e., the transverse direction in FIG. 2A) orthogonal to the direction in which the nozzles are aligned.

Furthermore, the circulation common liquid chamber 50 is covered by the common liquid chamber 10 from a surface opposite (i.e., the upward direction in FIG. 2A) to the direction in which liquid is discharged from the nozzles 4. Further, the circulation common liquid chamber 50 is covered by the common liquid chamber 10 from one of surfaces facing the direction (i.e., the leftward direction in FIG. 2A) orthogonal to both the direction in which liquid is discharged from the nozzles 4 and the direction in which the multiple nozzles 4 are aligned. As illustrated in FIG. 2A, the positional relation between the circulation common liquid chamber 50 and the common liquid chamber member 20 may be described such that the circulation common liquid chamber 50 occupies a part of space in the common liquid chamber member 20. Preferably, the circulation common liquid chamber 50 is included in the common liquid chamber member 20.

As described above, the common liquid chamber member 20 (or more specifically, the first common liquid chamber member 21), in which the circulation common liquid chamber 50 is formed, is joined to the above surface of the channel member 40 as illustrated in FIG. 2A.

Accordingly, dimension (or size) of the circulation common liquid chamber 50 is not restrained by dimensions necessary for the channel including the individual liquid chamber 6, the fluid resistance portion 7, and the liquid introduction portion 8, which are formed in the channel member 40.

Furthermore, as described above, the circulation common liquid chamber 50 and a part of the common liquid chamber 10 (i.e., the downstream common liquid chamber 10A) are arranged side by side in the transverse direction as illustrated in FIG. 2A. Further, as described above, the circulation common liquid chamber 50 and the common liquid chamber member 20 are in a relation that may be described such that the circulation common liquid chamber 50 occupies a part of space in the common liquid chamber member 20. Accordingly, width of the head with respect to the direction (i.e., the transverse direction in FIG. 2A) orthogonal to the direction in which the nozzles are aligned can be short, and therefore a size increase of the liquid discharging head can be avoided.

Figure 22:
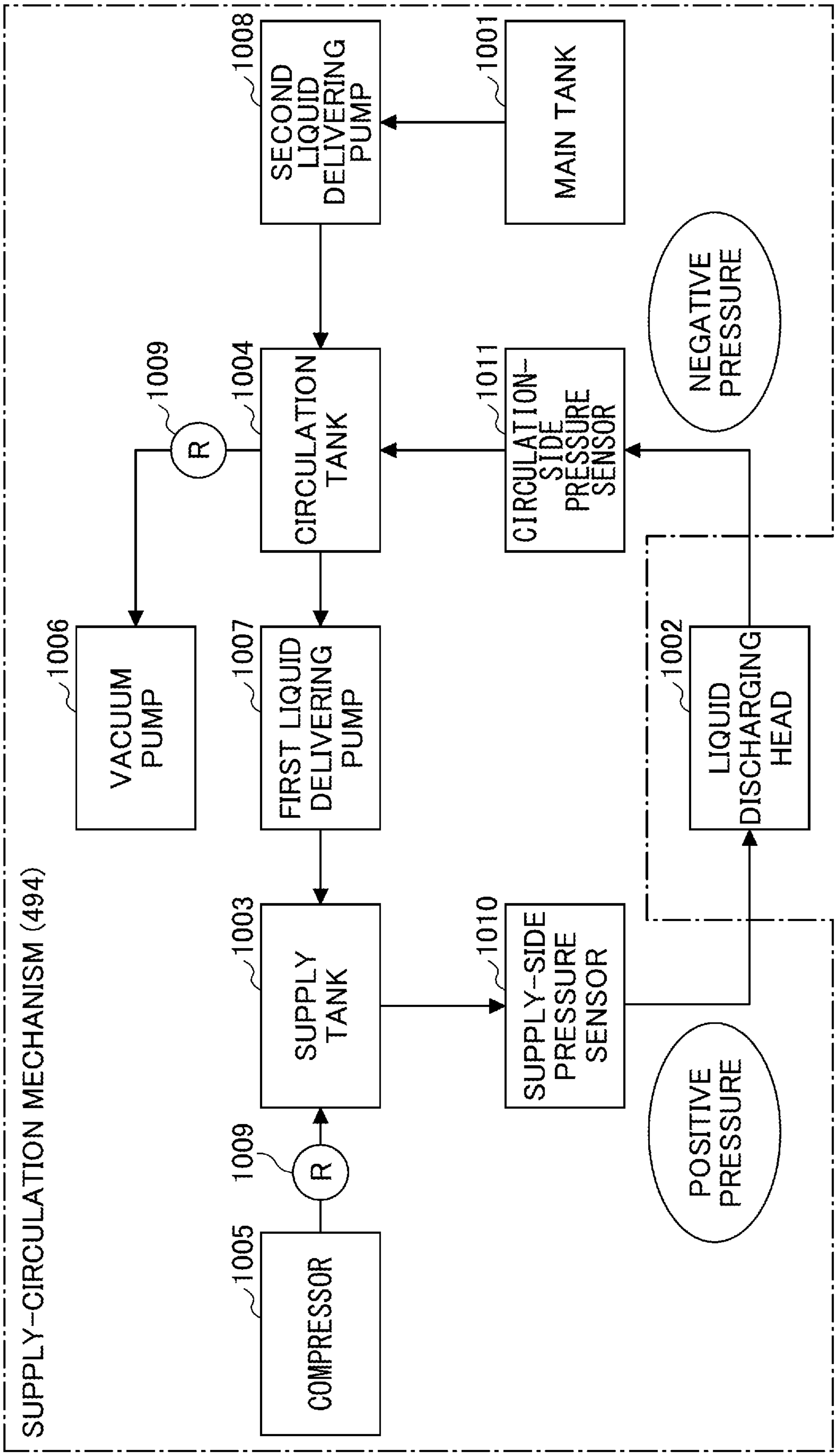
FIG. 22 is a block diagram illustrating an example of a liquid circulation system according to the first embodiment of the present invention.

Next, the following description explains an example of a liquid circulation system using the liquid discharging head according to the first embodiment, with reference to FIG. 22.

FIG. 22 is a block diagram illustrating an example of the liquid circulation system using the liquid discharging head according to the first embodiment.

As illustrated in FIG. 22, the liquid circulation system includes a main tank 1001, the liquid discharging head 1002 according to the above-described first embodiment, a supply tank 1003, a circulation tank 1004, a compressor 1005, a vacuum pump 1006, liquid delivering pumps 1007 and 1008, a regulator (R) 1009, a supply-side pressure sensor 1010, and a circulation-side pressure sensor 1011. Except for the liquid discharging head 1002 among the above, the main tank 1001, the supply tank 1003, the circulation tank 1004, the compressor 1005, the vacuum pump 1006, the liquid delivering pumps 1007 and 1008, the regulator (R) 1009, the supply-side pressure sensor 1010 and the circulation-side pressure sensor 1011 are included in a supply-circulation mechanism 494, which is described below with reference to FIG. 16.

The supply-side pressure sensor 1010 is arranged between the supply tank 1003 and the liquid discharging head 1002, and is connected to a supply channel that leads to a supply port 71 (cf. FIG. 1) of the liquid discharging head 1002.

The circulation-side pressure sensor 1011 is arranged between the liquid discharging head 1002 and the circulation tank 1004, and is connected to a circulation channel that leads to a circulation port 81 (cf. FIG. 1) of the liquid discharging head 1002.

One end of the circulation tank 1004 is connected to the supply tank 1003 via the first liquid delivering pump 1007, and another end of the circulation tank 1004 is connected to the main tank 1001 via the second liquid delivering pump 1008.

Accordingly, liquid flows from the supply tank 1003 to the liquid discharging head 1002 via the supply port 71, and is ejected into the circulation tank 1004 via the circulation port 81. Furthermore, liquid is delivered from the circulation tank 1004 to the supply tank 1003 via the first liquid delivering pump 1007, such that liquid circulates.

Furthermore, the compressor 1005 is connected to the supply tank 1003. The compressor 1005 is controlled, such that the supply-side pressure sensor 1010 detects a predetermined value of positive pressure.

Additionally, the vacuum pump 1006 is connected to the circulation tank 1004. The vacuum pump 1006 is controlled, such that the circulation-side pressure sensor 1011 detects a predetermined value of negative value. Accordingly, negative pressure applied to a meniscus of a nozzle 4 can be kept stable, while liquid flowing through the liquid discharging head 1002 is circulated.

Furthermore, when the liquid discharging head 1002 discharges a droplet from a nozzle 4, the amount of liquid in the supply tank 1003 and the circulation tank 1004 decreases. Therefore, it is preferable that the circulation tank 1004 is replenished with liquid from the main tank 1001 via the second liquid delivering pump 1008.

Timing of liquid replenishment from the main tank 1001 to the circulation tank 1004 may be controlled, based on a detection result of a liquid surface sensor, etc., provided inside the circulation tank 1004, such that liquid replenishment is conducted when liquid surface of ink inside the circulation tank 1004 gets lower than a predetermined level.

Next, the following description explains circulation of liquid in the liquid discharging head.

As illustrated in FIG. 1, FIG. 20, and FIG. 21, the supply port 71 that leads to the common liquid chamber 10 and the circulation port 81 that leads to the circulation common liquid chamber 50 are formed on ends of the common liquid chamber member 20. The supply port 71 and the circulation port 81 are respectively connected via tubes to the supply tank 1003 and the circulation tank 1004, which store liquid (cf. FIG. 22). Then, liquid stored in the supply tank 1003 is supplied to an individual liquid chamber 6, through the supply port 71, the common liquid chamber 10, the liquid introduction portion 8, and the fluid resistance portion 7 (cf. FIG. 2A and FIG. 3).

Note that, although liquid inside an individual liquid chamber 6 is discharged from a nozzle 4 by driving the piezoelectric member 12, liquid remained inside the individual liquid chamber 6 without being discharged is partially or entirely circulated to the circulation tank 1004 through the fluid resistance portion 51, the circulation channels 52 and 53, the circulation common liquid chamber 50, and the circulation port 81 (cf. FIG. 2A, FIG. 3, FIG. 20, and FIG. 21).

Note that circulation of liquid is preferred to be performed, not only while the liquid discharging head is operating, but also while the liquid discharging head is not operating. Circulation of liquid while the liquid discharging head is not operating helps liquid inside an individual liquid chamber 6 be always refreshed and helps components contained in liquid avoid from being agglomerated or accumulated.

Note that, in the example of the liquid circulation system as described above with reference to FIG. 22, which is provided with the liquid discharging head according to the first embodiment, the liquid discharging head according to the first embodiment is employed as the liquid discharging head 1002. However, the liquid discharging head 1002 in the example of the liquid circulation system may be a liquid discharging head according to a modification example of the liquid discharging head of the first embodiment or a liquid discharging head according to each of other embodiments and modification examples of the embodiments.

Modification Example of the First Embodiment

Next, a modification example of the liquid discharging head according to the first embodiment is described below.

FIG. 2B is a cross-sectional view of a part of a modification example of the above-described liquid discharging head according to the first embodiment of the present invention, which is viewed from the direction (i.e., the transverse direction of a liquid chamber) orthogonal to the direction in which the nozzles are aligned.

The liquid discharging head according to the first embodiment and the modification of the liquid discharging head according to the first embodiment are almost the same in terms of configurations and functions. In the modification example, constituent elements that are the same as or correspond to constituent elements of the liquid discharging head according to the first embodiment are assigned the same reference signs as assigned to the constituent elements of the liquid discharging head according to the first embodiment, so as to omit explanation.

Second Embodiment

Figure 5:
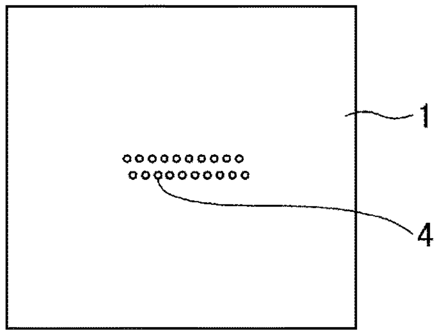
FIG. 5 is a plan view of an example of a nozzle plate according to each of the liquid discharging heads illustrated in FIGS. 4A and 4B.
Figure 6A:
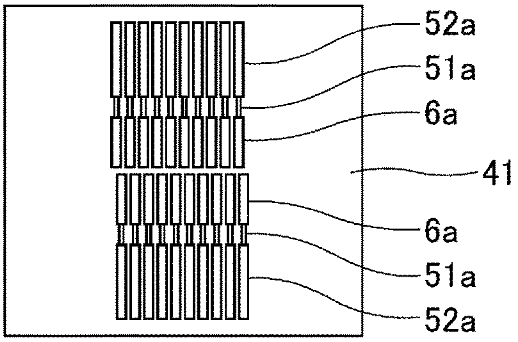
FIG. 6A is a plan view of an example of a part included in a channel member of the liquid discharging head according to the second embodiment of the present invention.
Figure 6B:
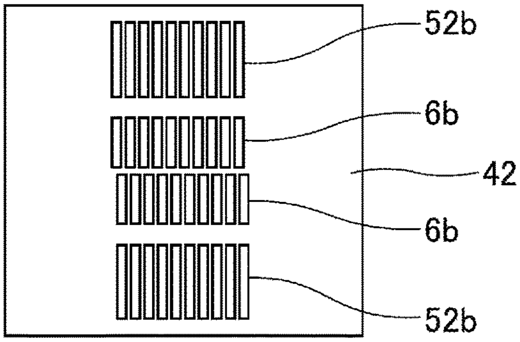
FIG. 6B is a plan view of an example of another part included in the channel member of the liquid discharging head.
Figure 6C:
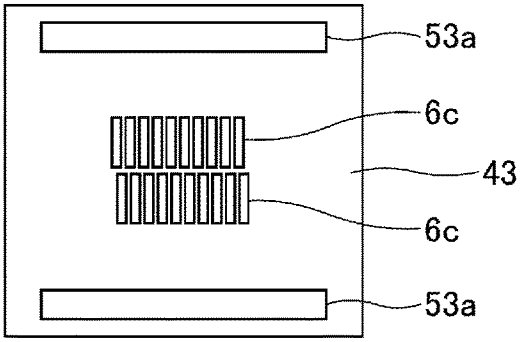
FIG. 6C is a plan view of an example of another part included in the channel member of the liquid discharging head.
Figure 6D:
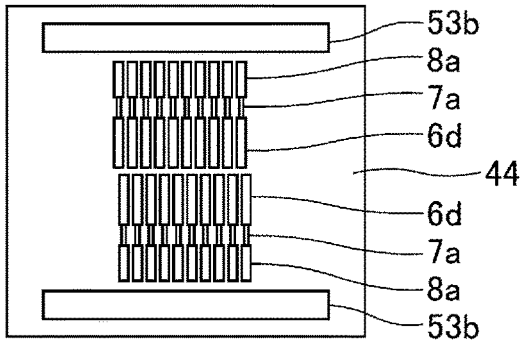
FIG. 6D is a plan view of an example of another part included in the channel member of the liquid discharging head.
Figure 6E:
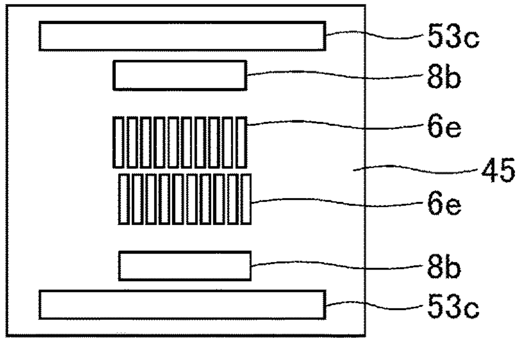
FIG. 6E is a plan view of an example of another part included in the channel member of the liquid discharging head.
Figure 6F:
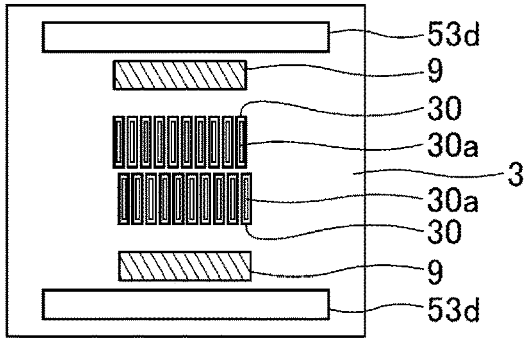
FIG. 6F is a plan view of an example of another part included in the channel member of the liquid discharging head.
Figure 7A:
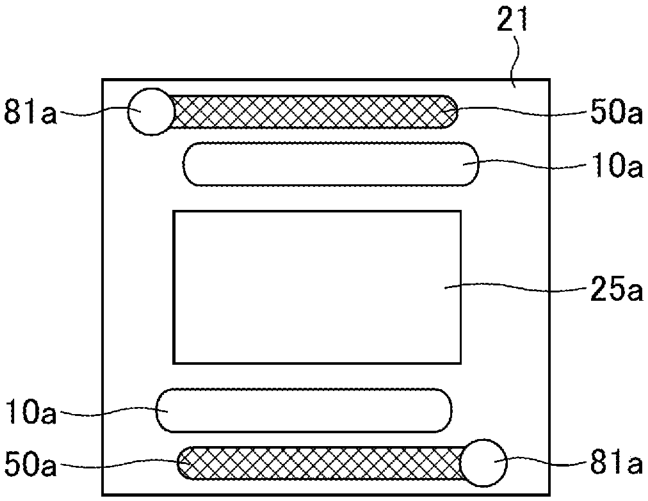
FIG. 7A is a plan view of an example of a member included in a common liquid chamber member of the liquid discharging head according to the second embodiment of the present invention, and also of an example of a member included in a common liquid chamber member of a modification example of the liquid discharging head as well.
Figure 7B:
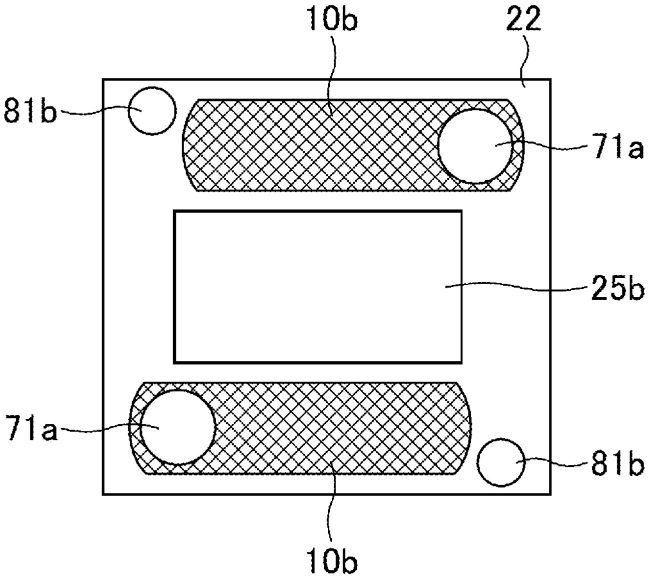
FIG. 7B is a plan view of an example of a member included in the common liquid chamber member of the liquid discharging head according to the second embodiment of the present invention, and also of an example of a member included in a common liquid chamber member of a modification example of the liquid discharging head as well.

Next, the following description explains a liquid discharging head according to the second embodiment of the present invention, with reference to FIG. 4A, FIGS. 6A through 6F, and FIGS. 7A and 7B. FIG. 4A is a cross-sectional view of a part of the liquid discharging head, which is viewed from the direction (i.e., the transverse direction of a liquid chamber) orthogonal to the direction in which the nozzles are aligned. FIG. 5 is a plan view of an example of a nozzle plate according to each of the liquid discharging head and a modification example of the liquid discharging head. FIGS. 6A through 6F are plan views of an example of each member included in the channel member 40 of the liquid discharging head according to the second embodiment. FIGS. 7A and 7B are plan views of an example of each member included in the common liquid chamber member 20 of the liquid discharging head, and also of an example of each member included in the common liquid chamber member of a modification example of the liquid discharging head as well.

The second embodiment and, for example, the above-described first embodiment are almost the same in terms of configurations and functions. The following description mainly explains parts that differ from the first embodiment, and explanations of parts that are the same as those in the first embodiment are omitted, as appropriate.

In the second embodiment, multiple plate members (i.e., thin layer members) 41 through 45 are layered on the nozzle plate 1 and joined to form the channel plate 2. The plate members 41 through 45 and the diaphragm member 3 are layered and joined to form the channel member 40.

Furthermore, similarly to the above-described first embodiment, the common liquid chamber member 20 includes the first common liquid chamber member 21 and the second common liquid chamber member 22.

Note that, on the nozzle plate 1, multiple nozzles 4 align in a zigzag manner as illustrated in FIG. 5, (which is the same in the first embodiment).

As illustrated in FIG. 6A, through-groove portions (i.e., a through-hole a shape of a groove; hereinafter meaning the same) 6*a* to form individual chambers 6, and through-groove portions 51*a* and 52*a* to respectively form fluid resistance portions 51 and circulation channels 52 are formed on the plate member 41, which is included in the channel plate 2.

As illustrated in FIG. 6B, through-parts 6*b* to form individual liquid chambers 6, and through-groove portions 52*b* to form circulation channels 52 are formed on the plate member 42.

As illustrated in FIG. 6C, plate-shaped through-groove portions 6*c* to form individual liquid chambers 6, and through-groove portions 53*a*, whose longitudinal direction is the direction in which the nozzles are aligned, to form circulation channels 53 are formed on the plate member 43.

As illustrated in FIG. 6D, through-groove portions 6*d* to form individual liquid chambers 6, through-groove portions 7*a* to become fluid resistance portions 7, through-groove portions 8*a* to form liquid introduction portions 8, and through-groove portions 53*b*, whose longitudinal direction is the direction in which the nozzles are aligned, to form circulation channels 53 are formed on the plate member 44.

As illustrated in FIG. 6E, through-groove portions 6*e* to form individual liquid chambers 6, and through-groove portions 8*b*, whose longitudinal direction is the direction in which the nozzles are aligned, to form liquid introduction portions 8 (i.e., to become liquid chambers that are downstream of filters) are formed on the plate member 45. Further, through-groove portions 53*c*, whose longitudinal direction is the direction in which the nozzles are aligned, to form circulation channels 53 are formed on the plate member 45.

As illustrated in FIG. 6F, the vibration areas 30, the filter portions 9, and through-groove portions 53*d*, whose longitudinal direction is the direction in which the nozzles are aligned, to form circulation channels 53 are formed on the diaphragm member 3.

As illustrated in FIG. 7A, a through-hole 25*a* provided for a piezoelectric actuator, through-groove portions 10*a* to become downstream common liquid chambers 10A, and groove-parts 50*a* with undersurfaces to become circulation common liquid chambers 50 are formed on the first common liquid chamber member 21 included in the common liquid chamber member 20.

Similarly, as illustrated in FIG. 7B, a through-hole 25*b* provided for a piezoelectric actuator, and groove-parts 10*b* to become upstream common liquid chambers 10B are formed on the second common liquid chamber member 22.

Furthermore, with reference to FIG. 1 as well as FIG. 7B, through-holes 71*a* to become supply port portions, which connect an end of each common liquid chamber 10 in the direction in which the nozzles are aligned with a corresponding supply port (or liquid port) 71, are formed on the second common liquid chamber member 22.

Similarly, through-holes 81*a* and 81*b*, which connect another end (i.e., the opposite end of the through-holes 71*a*) of each circulation common liquid chamber 50 in the direction in which the nozzles are aligned with a corresponding circulation port (or liquid port) 81, are formed on the first common liquid chamber member 21 and the second common liquid chamber member 22.

Note that, in FIGS. 7A and 7B, groove-parts with undersurfaces other than the above-mentioned groove-parts 50*a* with undersurfaces are illustrated with hatching (which may be also referred to as "cross-hatching") similarly to the above-mentioned groove-parts 50*a* with undersurfaces (in the following drawings as well).

As described above, complex channels can be formed in a relatively easy way, such that multiple plate members are layered and joined to form the channel member 40.

Modification of the Second Embodiment

The following description explains a modification example of the liquid discharging head according to the second embodiment.

Figure 4B:
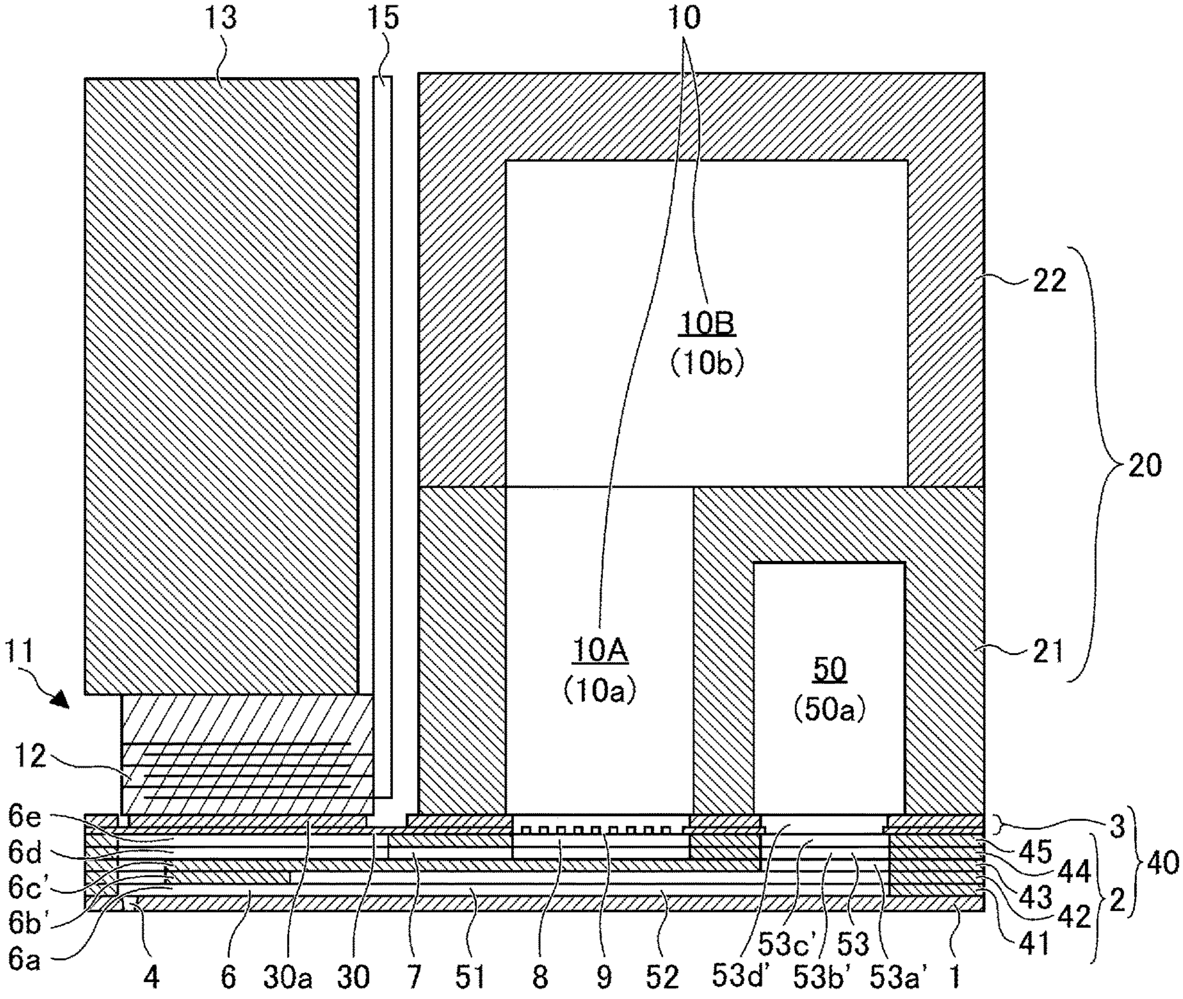
FIG. 4B is a cross-sectional view of a part of the example of the liquid discharging head according to the second embodiment of the present invention, which is viewed from the direction (i.e., the transverse direction of a liquid chamber) orthogonal to the direction in which the nozzles are aligned.

FIG. 4B is a cross-sectional view of a part of a modification example of the liquid discharging head according to the above-described second embodiment of the present invention, which is viewed from the direction (i.e., the transverse direction of a liquid chamber) orthogonal to the direction in which the nozzles are aligned. FIGS. 6G through 6L are plan views of an example of each member included in the channel member 40 of the modification example of the liquid discharging head.

The modification example of the liquid discharging head according to the second embodiment and the liquid discharging head according to the second embodiment described above are almost the same in terms of configurations and functions. In the modification example, constituent elements that are the same as or correspond to constituent elements of the liquid discharging head according to the second embodiment are assigned the same reference signs as assigned to the constituent elements of the liquid discharging head according to the second embodiment, so as to omit explanation.

Furthermore, as clearly seen when comparing FIG. 4B and FIG. 2B, the modification example of the liquid discharging head according to the second embodiment and the modification example of the liquid discharging head according to the above-described first embodiment are almost the same in terms of configurations of the channel plate 2.

Figure 6G:
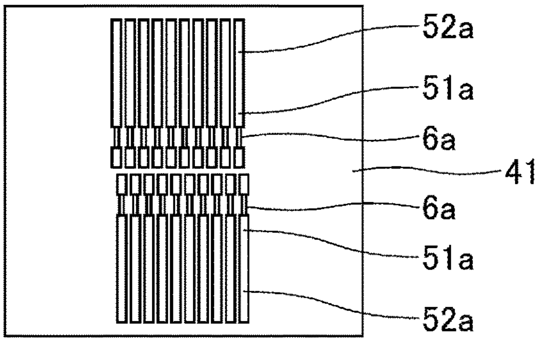
FIG. 6G is a plan view of an example of a part included in a channel member of a modification example of the liquid discharging head according to the second embodiment of the present invention.

In the modification example of the liquid discharging head according to the second embodiment, as illustrated in FIG. 6G, through-groove portions 6*a* to form individual liquid chambers 6, and through-groove portions 51*a* and 52*a* to respectively form fluid resistance portions 51 and circulation channels 52 are formed on the plate member 41, which is included in the channel plate 2.

Figure 6H:
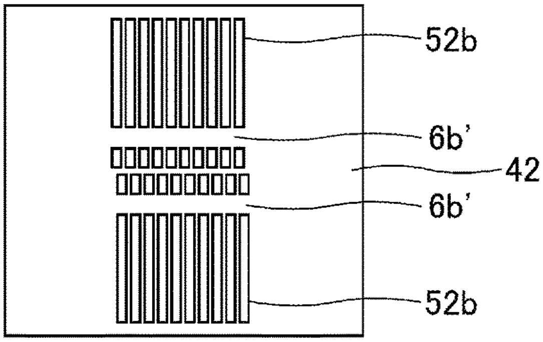
FIG. 6H is a plan view of an example of another part included in the channel member of the modification example of the liquid discharging head.

Furthermore, as illustrated in FIG. 6H, plate portions 6*b*' to form individual liquid chambers 6, and through-groove portions 52*b* to form circulation channels 52 are formed on the plate member 42.

Figure 6I:
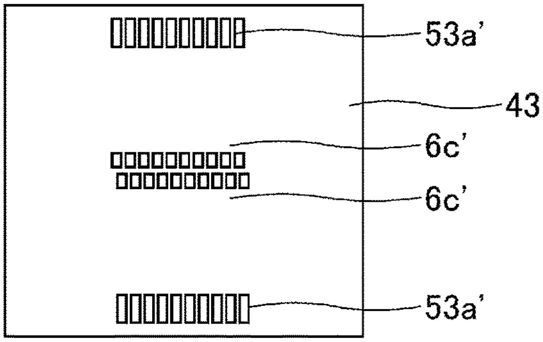
FIG. 6I is a plan view of an example of another part included in the channel member of the modification example of the liquid discharging head.

Furthermore, as illustrated in FIG. 6I, plate portions 6*c*' to form individual liquid chambers 6, and through-groove portions 53*a*' to form circulation channels 53 are formed on the plate member 43.

Figure 6J:
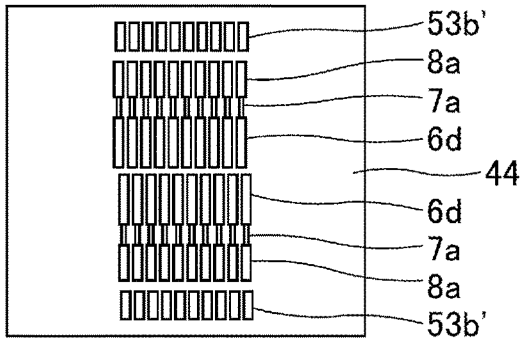
FIG. 6J is a plan view of an example of another part included in the channel member of the modification example of the liquid discharging head.

Furthermore, as illustrated in FIG. 6J, through-groove portions 6*d* to form individual liquid chambers 6, through-groove portions 7*a* to become fluid resistance portions 7, through-groove portions 8*a* to form liquid introduction portions 8, and through-groove portions 53*b*' to form circulation channels 53 are formed on the plate member 44.

Figure 6K:
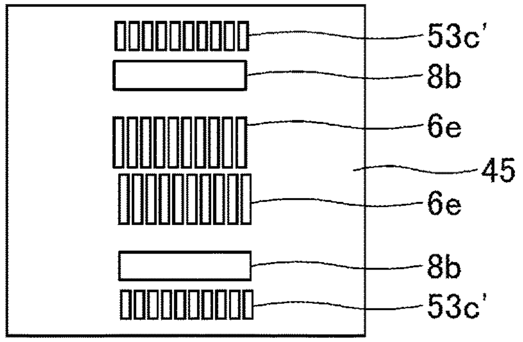
FIG. 6K is a plan view of an example of another part included in the channel member of the modification example of the liquid discharging head.

Furthermore, as illustrated in FIG. 6K, through-groove portions 6*e* to form individual liquid chambers 6, and through-groove portions 8*b*, whose longitudinal direction is the direction in which the nozzles are aligned, to become liquid introduction portions 8 (i.e., to become liquid chambers that are downstream of filters) are formed on the plate member 45. Further, through-groove portions 53*c*' to form circulation channels 53 are formed on the plate member 45.

Figure 6L:
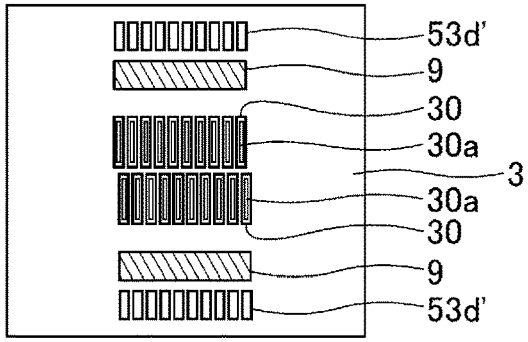
FIG. 6L is a plan view of an example of another part included in the channel member of the modification example of the liquid discharging head.

Furthermore, as illustrated in FIG. 6L, vibration areas 30, filter portions 9, and through-groove portions 53*d*' to form circulation channels 53 are formed on the diaphragm member 3.

Third Embodiment

Figure 8A:
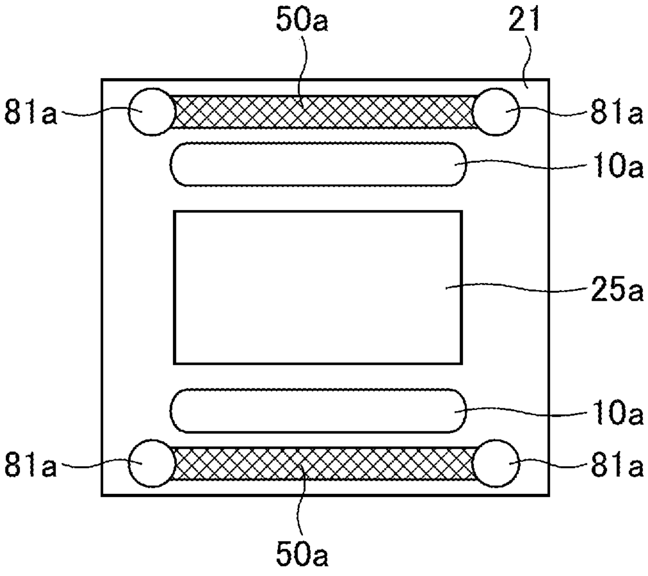
FIG. 8A is a plan view of an example of a first common liquid chamber member of a liquid discharging head according to a third embodiment of the present invention.

The following description explains a liquid discharging head according to the third embodiment of the present invention, with reference to FIGS. 8A and 85.

The third embodiment and, for example, each of the liquid discharging head according to the above-described second embodiment and the modification of the liquid discharging head according to the second embodiment are almost the same in terms of configurations and functions. The following description mainly explains parts that differ from the liquid discharging head according to the second embodiment and the modification of the liquid discharging head according to the second embodiment, and explanations of parts that are the same as those in the liquid discharging head according to the second embodiment and the modification of the liquid discharging head according to the second embodiment are omitted, as appropriate.

Figure 8B:
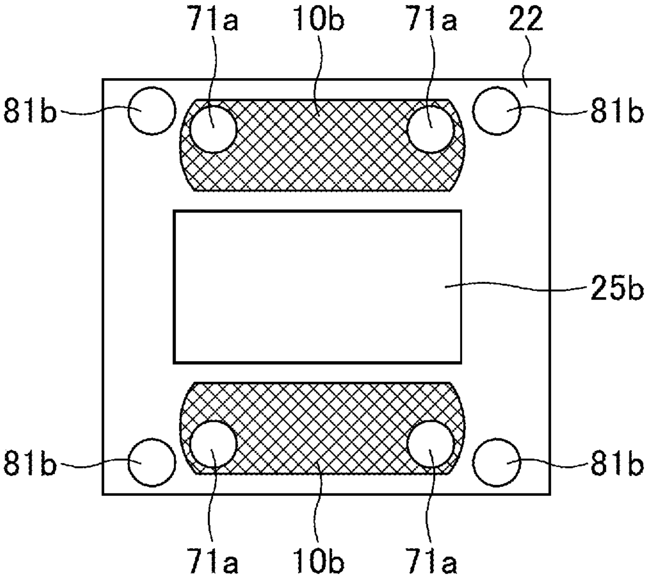
FIG. 8B is a plan view of an example of a second common liquid chamber member of the liquid discharging head according to the third embodiment of the present invention.

FIGS. 8A and 8B are plan views of examples of a common liquid chamber member 20 of a liquid discharging head according to the third embodiment. Note that FIG. 8A is a plan view of an example of the first common liquid chamber member 21, and FIG. 8B is a plan view of an example of the second common liquid chamber member 22.

According to the third embodiment, regarding the first common liquid chamber member 21, through-holes 81*a* to be connected to liquid ports 81 are formed on both ends of the circulation common liquid chamber 50 in the direction in which the nozzles are aligned. Regarding the second common liquid chamber member 22, through-holes 81*b* to form the liquid ports 81 are formed on both ends of the circulation common liquid chamber 50 in the direction in which the nozzles are aligned, and through-holes 71*a* to be connected to liquid ports 71 are formed on both ends of each of common liquid chambers 10 in the direction in which the nozzles are aligned.

Accordingly, as each of the common liquid chambers 10 receives supply from the both ends, probability of faulty refill can be reduced.

Fourth Embodiment

Figure 9A:
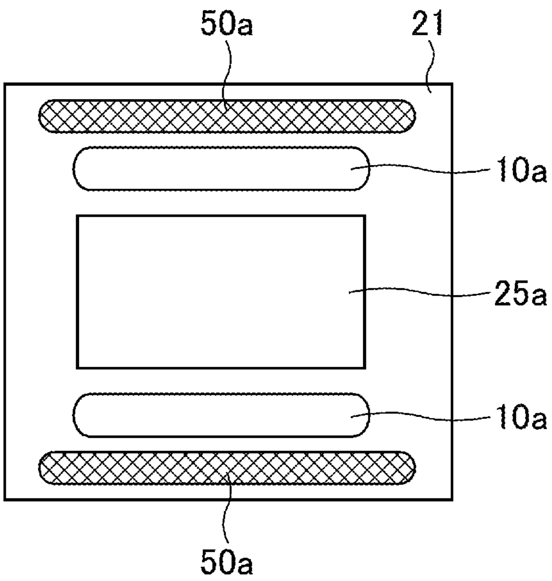
FIG. 9A is a plan view of an example of a first common liquid chamber member of a liquid discharging head according to a fourth embodiment of the present invention.
Figure 9B:
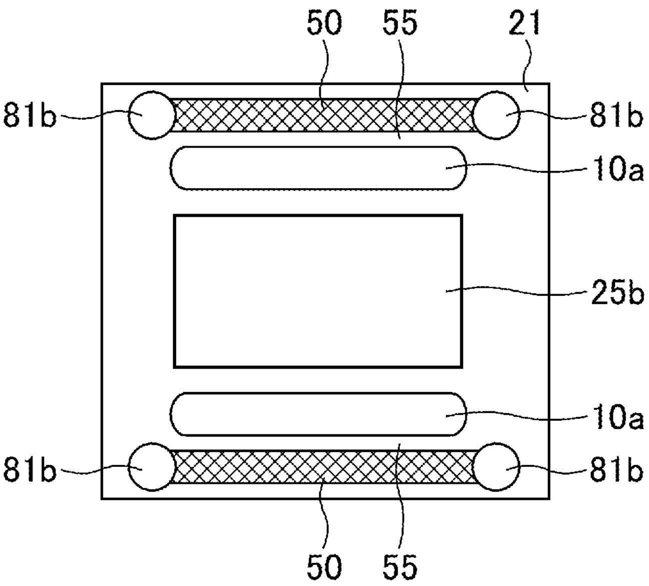
FIG. 9B is a plan view of an example of the first common liquid chamber member of the liquid discharging head according to the fourth embodiment of the present invention in a subsequent manufacturing process.

The following description explains a liquid discharging head according to the fourth embodiment of the present invention, with reference to FIGS. 9A and 9B.

The fourth embodiment and, for example, the above-described third embodiment are almost the same in terms of configurations and functions. The following description mainly explains parts that differ from the third embodiment, and explanations of parts that are the same as those in the third embodiment are omitted, as appropriate.

FIGS. 9A and 9B are plan views of the first common liquid chamber member 21 of the liquid discharging head in each manufacturing process.

According to the fourth embodiment, as illustrated in FIG. 9A, groove-parts 50*a* to become circulation common liquid chambers 50 are formed by half-etching, and through-groove portions 10*a* to become downstream common liquid chambers 10A are formed by full-etching on the first common liquid chamber member 21

Then, as illustrated in FIG. 9B, through-holes are made through the above-described half-etched parts in laser processing, so as to form parts 81*b* that correspond to liquid ports 81.

Accordingly, thin dividing walls 55 between each common liquid chamber 10 (i.e., downstream common liquid chamber 10A) and each circulation common liquid chamber 50 are formed with high accuracy.

Fifth Embodiment

Figure 10A:
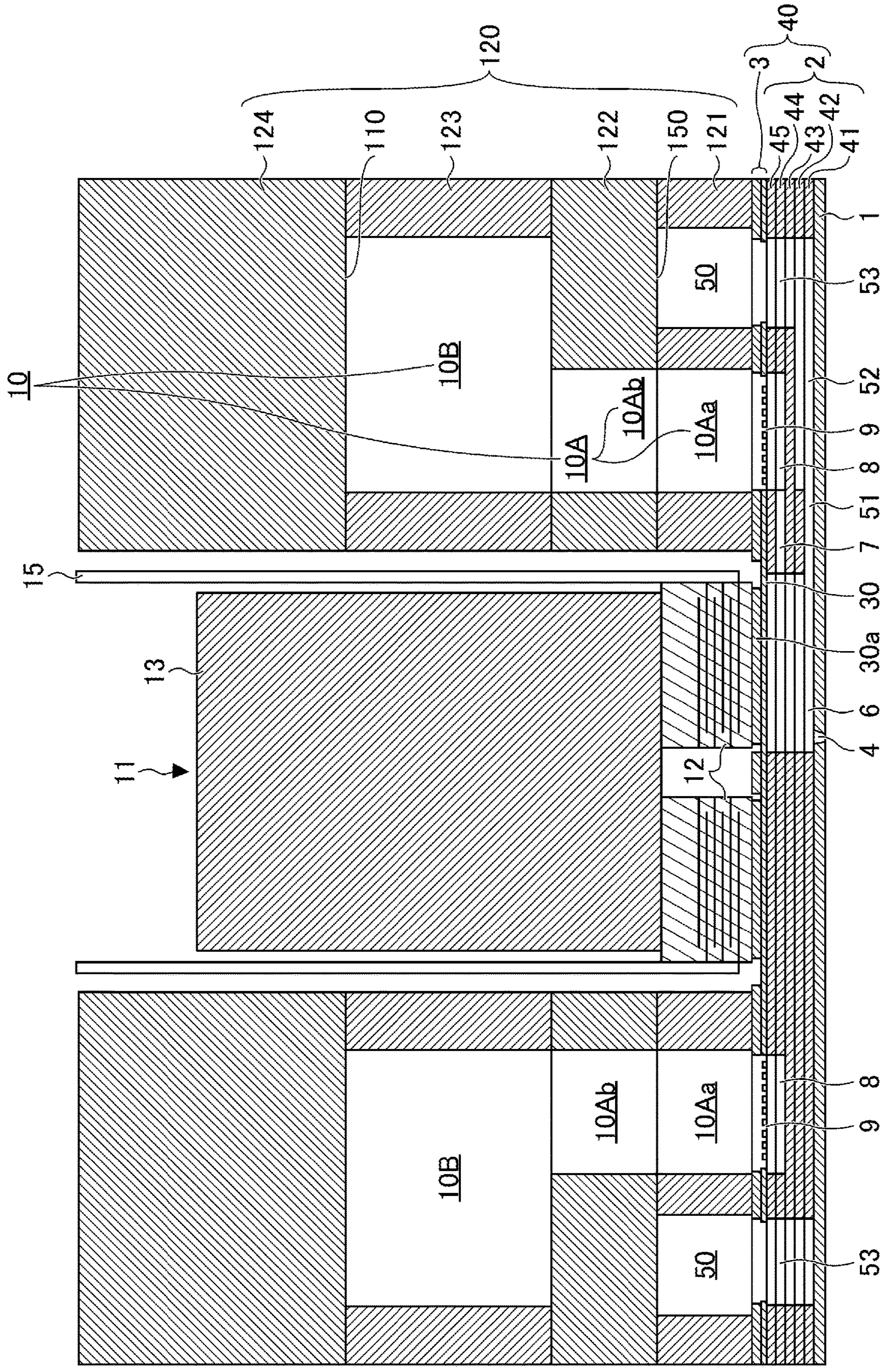
FIG. 10A is a cross-sectional view of an example of a liquid discharging head according to a fifth embodiment of the present embodiment, which is viewed from the direction (i.e., the transverse direction of a liquid chamber) orthogonal to the direction in which the nozzles are aligned.

The following description explains a liquid discharging head according to the fifth embodiment of the present invention, with reference to FIG. 10A and FIGS. 11A through 11D. FIG. 10A is a cross-sectional view of an example of the liquid discharging head, which is viewed from the direction (i.e., the transverse direction of a liquid chamber) orthogonal to the direction in which the nozzles are aligned. FIGS. 11A through 11D are plan views of each member included in the common liquid chamber member of the liquid discharging head, and also of each member included in the common liquid chamber member of a modification example of the liquid discharging head.

The fifth embodiment and, for example, the second embodiment as described above with reference to FIG. 4A, etc., are almost the same in terms of configurations and functions. The following description mainly explains parts that differ from the second embodiment, and explanations of parts that are the same as those in the second embodiment are omitted, as appropriate.

Unlike FIG. 4A, etc., FIG. 10A is a cross-sectional view of an example of the liquid discharging head viewed from the direction (i.e., the transverse direction of a liquid chamber) orthogonal to the direction in which the nozzles are aligned, but both of left and right halves are illustrated. Note that, although the right half illustrated in FIG. 10A has a cross-section along a surface of an individual liquid chamber 6, etc., similarly to FIG. 2A, etc., the left half has a cross-section along a surface of a dividing wall part 2*a* (cf. FIG. 3) that divides individual liquid chambers 6 apart. The reason for the above is because the nozzles 4 are formed in a zigzag manner, as described above with reference to FIG. 5. In other words, as illustrated in FIGS. 6A through 6F, in accordance with alignment of the nozzles 4, positions of individual liquid chambers 6 along the direction in which the nozzles are aligned are unmatched between the right and left halves (illustrated in FIG. 10A) by almost a half pitch of the individual liquid chambers 6. Accordingly, for example, as illustrated in FIG. 10A, even on a cross-section along the same surface, the right half has a cross-section along a surface of an individual liquid chamber 6, and the left half has a cross-section along a surface of a dividing wall part 2*a* that divides individual liquid chambers 6 apart. The same applies to FIG. 10B.

According to the embodiment 5, a common liquid chamber member 120 includes at least three members that are joined to be layers: a first common liquid chamber member 121, a second common liquid chamber member 122, a third common liquid chamber member 123, and a housing member 124 that functions also as a fourth common liquid chamber member. That is to say, a common liquid chamber member 120 includes four members 121 through 124 in total. Note that, similarly to the second common liquid chamber member 22 in each of the above embodiments, the third common liquid chamber member 123 may be replaced by a member having a unified wall part, which is otherwise formed by the housing member 124.

Figure 11A:
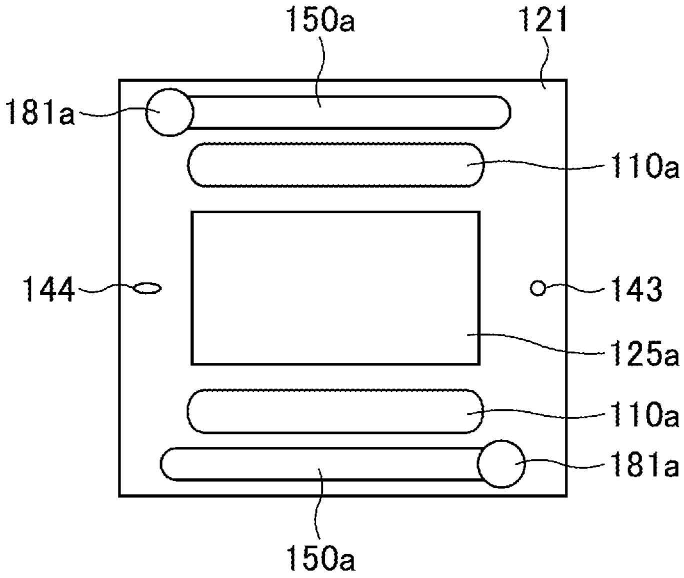
FIG. 11A is a plan view of an example of a member included in a common liquid chamber member of the liquid discharging head according to the fifth embodiment of the present invention, and also of a member included in a common liquid chamber member of a modification example of the liquid discharging head.

Note that the first common liquid chamber member 121 is an example of "one of two members arranged in series in the direction of layering, which are among the three members". As illustrated in FIG. 11A, a through-hole 125*a* provided for a piezoelectric actuator and through-groove portions 110*a*, which are through-parts to become parts 10Aa (cf. FIG. 10A) of downstream common liquid chambers 10A, are formed on the first common liquid chamber member 121. Furthermore, through-groove portions 150*a*, which are through-parts to become circulation common liquid chambers 50, are formed on the first common liquid chamber member 121.

Figure 11B:
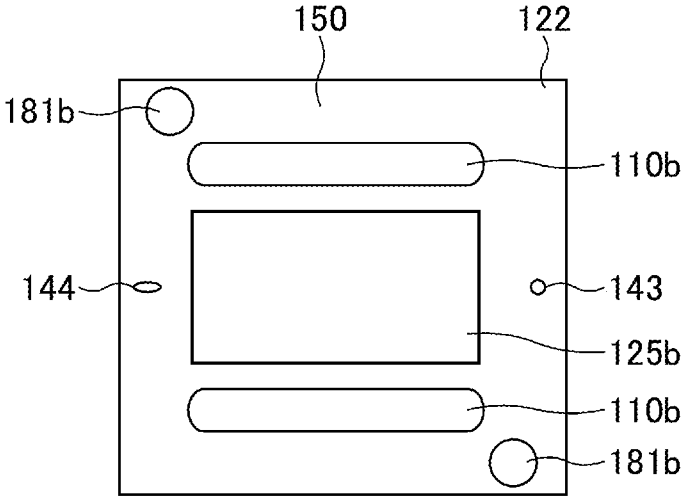
FIG. 11B is a plan view of an example of another member included in the common liquid chamber member of the liquid discharging head according to the fifth embodiment of the present invention, and also of another member included in the common liquid chamber member of the modification example of the liquid discharging head.

The second common liquid chamber member 122 is an example of "another one of two members arranged in series in the direction of layering, which are among the three members". As illustrated in FIG. 11B, a through-hole 125*b* provided for a piezoelectric actuator and through-groove portions 110*b*, which are through-parts to become parts 10Ab (cf. FIG. 10A) of downstream common liquid chambers 10A, are formed on the second common liquid chamber member 122. Furthermore, the second common liquid chamber member 122 is provided as a wall part (or a wall surface) 150 of the circulation common liquid chamber 50.

Figure 11C:
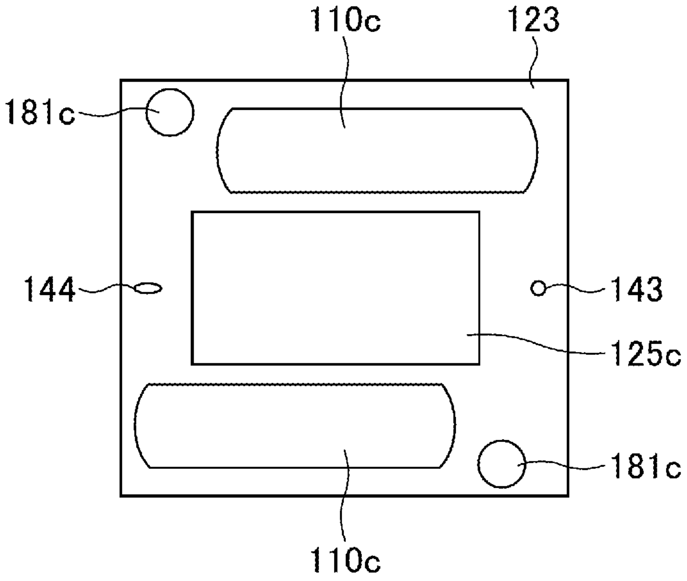
FIG. 11C is a plan view of an example of another member included in the common liquid chamber member of the liquid discharging head according to the fifth embodiment of the present invention, and also of another member included in the common liquid chamber member of the modification example of the liquid discharging head.

As illustrated in FIG. 11C, a through-hole 125*c* provided for a piezoelectric actuator and through-holes 110*c*, which are through-parts to become upstream common liquid chambers 10B, are formed on the third common liquid chamber member 123.

Figure 11D:
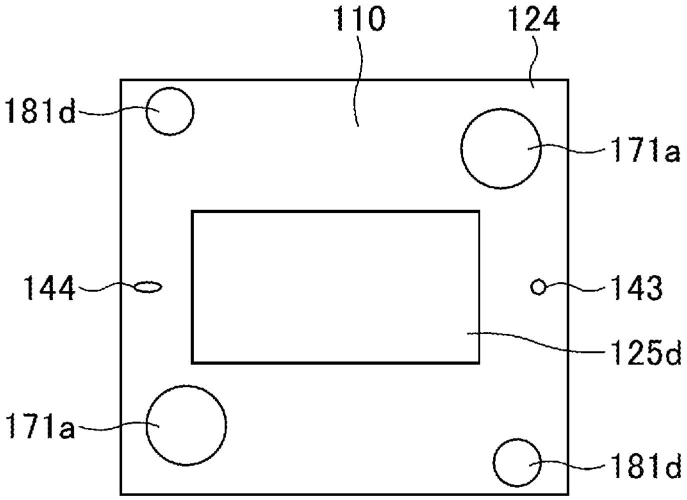
FIG. 11D is a plan view of an example of another member included in the common liquid chamber member of the liquid discharging head according to the fifth embodiment of the present invention, and also of another member included in the common liquid chamber member of the modification example of the liquid discharging head.

As illustrated in FIG. 11D, a through-hole 125*d* provided for a piezoelectric actuator is formed on the housing member 124. The housing member 124 is provided as a wall part (or a wall surface) 110 of upstream common liquid chambers 10B.

Furthermore, through-holes 171*a* to become supply port portions that connect an end of each common liquid chamber 10 in the direction in which the nozzles are aligned and a corresponding supply port (or liquid port; cf. FIG. 1) 71 are formed on the housing member 124.

Furthermore, through-holes 181*a*, 181*b*, 181*c*, and 181*d* that connect another end (i.e., the opposite end of the through-holes 171*a*) of each circulation common liquid chamber 50 in the direction in which the nozzles are aligned with a corresponding circulation port (or liquid port; cf. FIG. 1) 81 are formed on the first common liquid chamber member 121, the second common liquid chamber member 122, the third common liquid chamber member 123, and the housing member 124.

Note that reference holes 143 and elliptical holes 144 are provided on the first common liquid chamber member 121, the second common liquid chamber member 122, the third common liquid chamber member 123, and the housing member 124, as alignment marks for assembly.

Modification of the Fifth Embodiment

Next, the following description explains a modification example of the liquid discharging head according to the fifth embodiment.

Figure 10B:
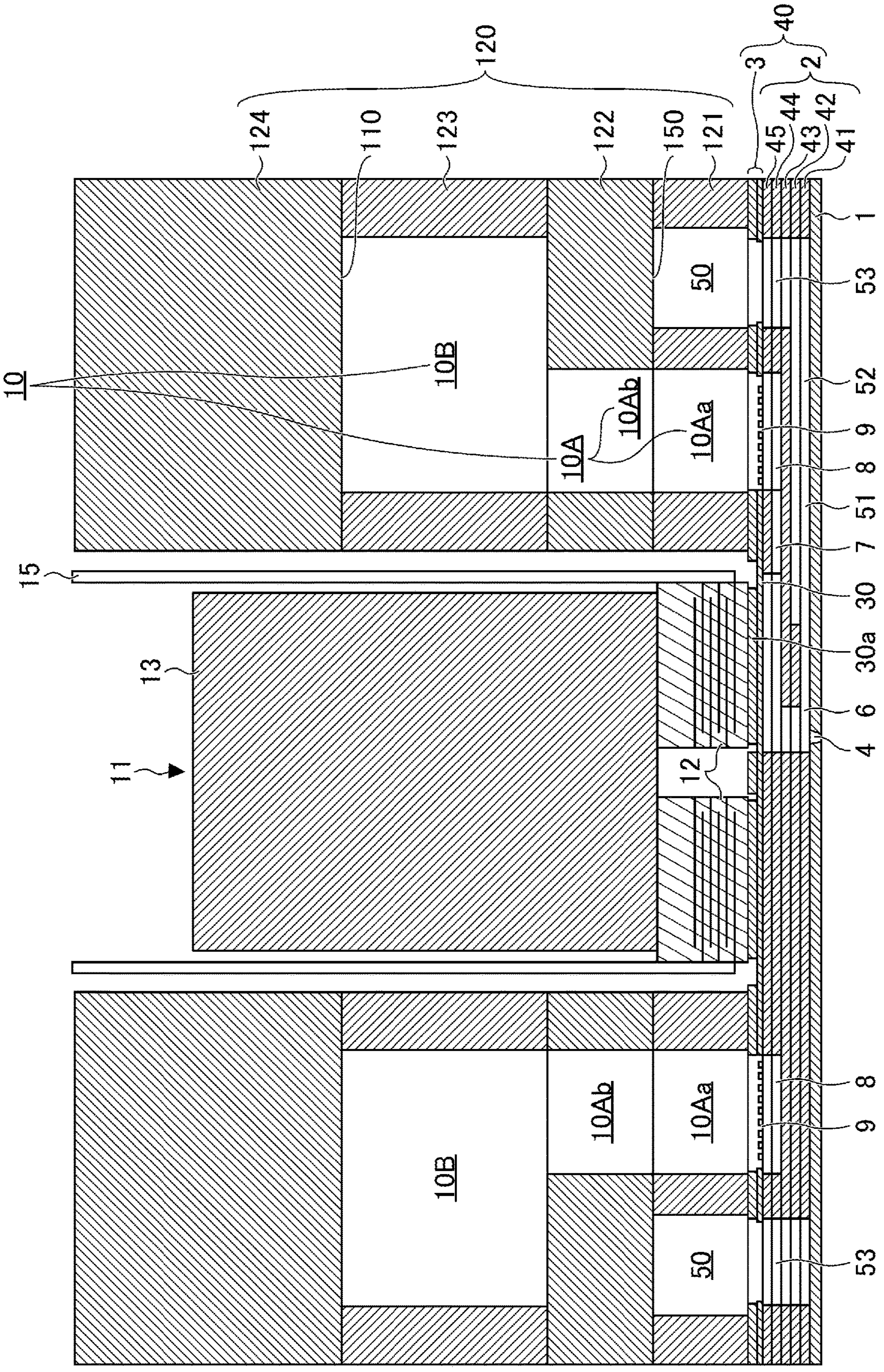
FIG. 10B is a cross-sectional view of an example of a modification example of the liquid discharging head according to the fifth embodiment of the present embodiment, which is viewed from the direction (i.e., the transverse direction of a liquid chamber) orthogonal to the direction in which the nozzles are aligned.

FIG. 10B is a cross-sectional view of a part of a modification example of the liquid discharging head according to the above-described fifth embodiment of the present invention, which is viewed from the direction (i.e., the transverse direction of a liquid chamber) orthogonal to the direction in which the nozzles are aligned.

The modification example of the liquid discharging head according to the fifth embodiment and the liquid discharging head according to the fifth embodiment described above have almost the same configurations and functions. In the modification example, constituent elements that are the same as or correspond to constituent elements of the liquid discharging head according to the fifth embodiment are assigned the same reference signs as assigned to the constituent elements of the liquid discharging head according to the fifth embodiment, so as to omit explanation.

Furthermore, as clearly seen when comparing FIG. 10B with FIG. 2B or FIG. 4B, the modification example of the quid discharging head according to the fifth embodiment and the modification examples of the liquid discharging head according to the first embodiment and the second embodiment are almost the same in terms of configurations of the channel plate 2.

Sixth Embodiment

Figure 12:
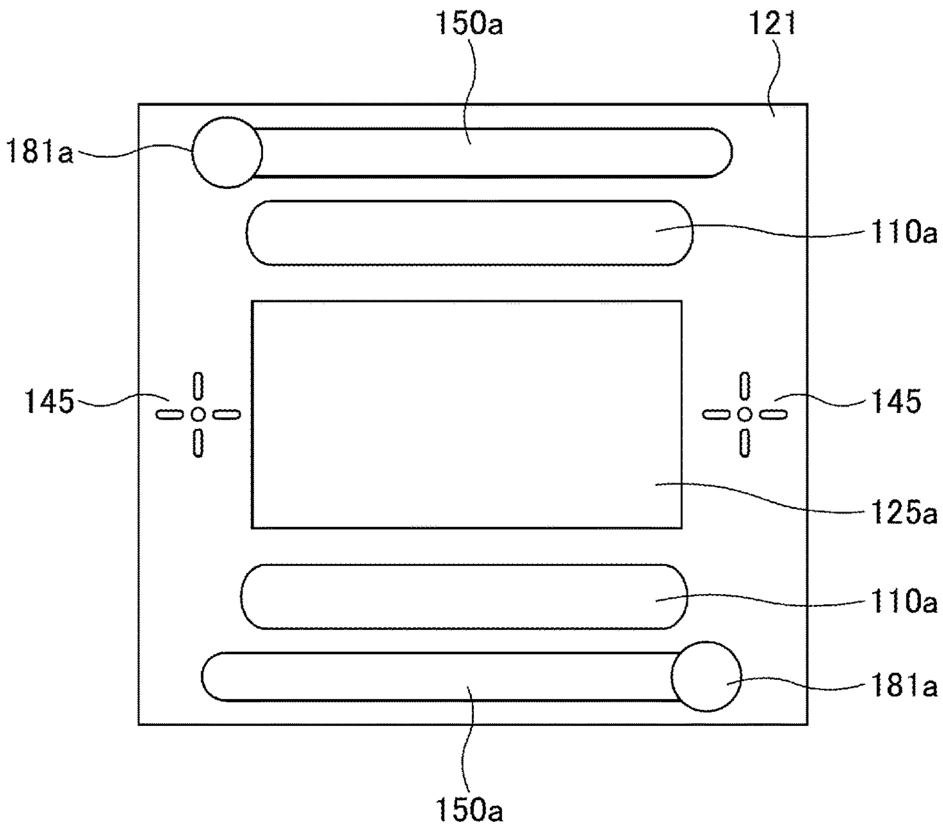
FIG. 12 is a plan view of a first common liquid chamber member of a liquid discharging head according to a sixth embodiment of the present invention.
Figure 13:
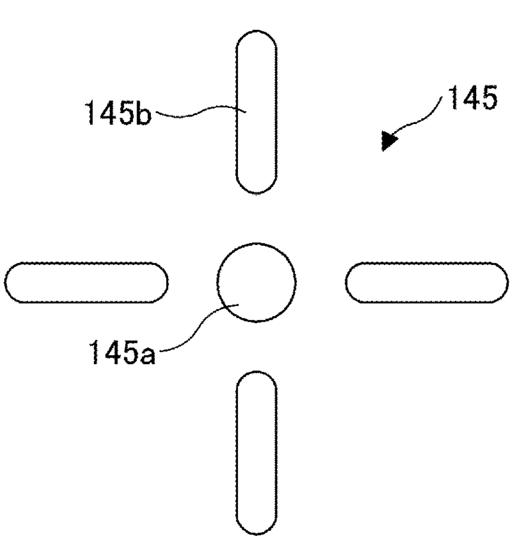
FIG. 13 is an enlarged view of a part of FIG. 12.

Next, the following description explains a liquid discharging head according to the sixth embodiment of the present invention, with reference to FIG. 12 and FIG. 13. FIG. 12 is a plan view of a first common liquid chamber member of the liquid discharging head, and FIG. 13 is an enlarged view of a part of FIG. 12.

The sixth embodiment and, for example, each of the fifth embodiment and the modification example of the liquid discharging head according to the fifth embodiment as described above with reference to FIGS. 10A and 10B and FIGS. 11A through 11D are almost the same in terms of configurations and functions. The following description mainly explains parts that differ from the fifth embodiment and the modification example of the liquid discharging head according to the fifth embodiment, and explanations of parts that are the same as those in the fifth embodiment and the modification example of the liquid discharging head according to the fifth embodiment are omitted, as appropriate.

According to the sixth embodiment, alignment marks 145 are provided at two positions on the first common liquid chamber member 121 of the above-described fifth embodiment, instead of the reference hole 143 and the elliptical hole 144. Each of the alignment marks includes a reference hole 145*a* and slit holes 145*b* that are arranged around the reference hole 145*a* at four positions in the same distance from each other. Alignment marks 145 are similarly provided on the second common liquid chamber member 122, the third common liquid chamber member 123, and the housing member 124.

Given such a configuration, positioning with higher accuracy can be achieved, compared to the fifth embodiment.

Seventh Embodiment

Next, the following description explains a liquid discharging head according to the seventh embodiment of the present invention, with reference to FIG. 14A. FIG. 14A is a cross-sectional view of a part of an example of the liquid discharging head, which is viewed from the direction (i.e., the transverse direction of a liquid chamber) orthogonal to the direction in which the nozzles are aligned.

The seventh embodiment and, for example, the fifth embodiment described above with reference to FIG. 10A and FIGS. 11A through 11D are almost the same in terms of configurations and functions. The following description mainly explains parts that differ from the fifth embodiment, and explanations of parts that are the same as those in the fifth embodiment are omitted, as appropriate.

According to the seventh embodiment, as illustrated in FIG. 14A, the first common liquid chamber member 121, the second common liquid chamber member 122, and the third common liquid chamber member 123 are joined and layered with positional gaps in the direction (i.e., the transverse direction in FIG. 14A) orthogonal of the direction in which the nozzles are aligned.

For example, the first common liquid chamber member 121, the second common liquid chamber member 122, and the third common liquid chamber member 123 may be formed in press processing to have such deformation. The members 121 through 124 with the deformation are joined, such that ledge parts 146 are created between each of the first common liquid chamber member 121, the second common liquid chamber member 122, the third common liquid chamber member 123, and the housing member 124, due to the deformation.

As described above, the ledge parts 146 are created between each of the first common liquid chamber member 121, the second common liquid chamber member 122, the third common liquid chamber member 123, and the housing member 124. Accordingly, even in a case where adhesive agent 90 used for joining each of the members 121 through 124 is protruded from the joint parts, the protruded adhesive agent 90 is accommodated by the ledge parts 146. Therefore, the adhesive agent 90 is prevented from flowing into the common liquid chamber 10 and then getting solidified, which may cause bubbles to get trapped.

Modification of the Seventh Embodiment

Next, the following description explains a modification example of the liquid discharging head according to the seventh embodiment.

Figure 14B:
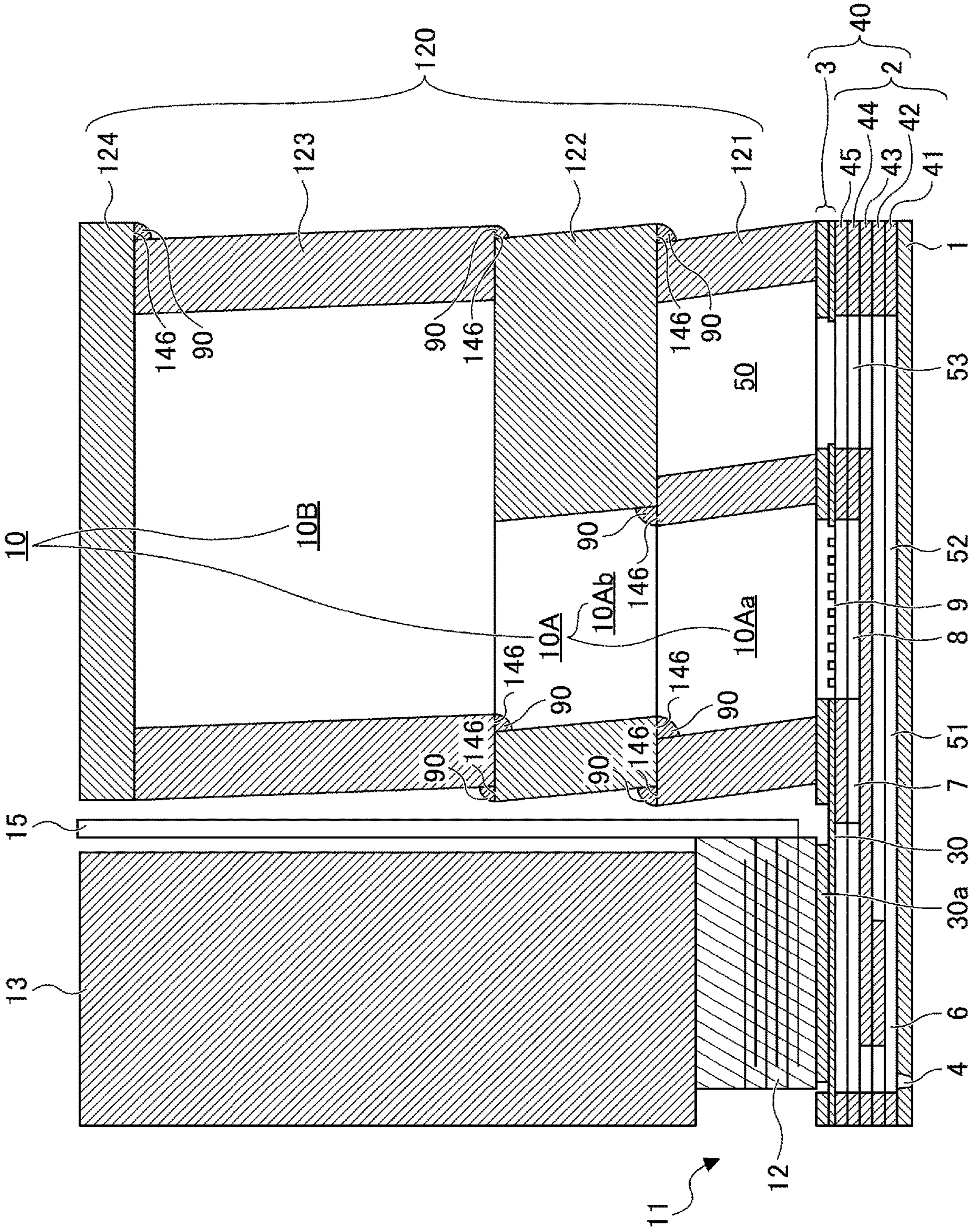
FIG. 14B is a cross-sectional view of a part of a modification example of the liquid discharging head according to the seventh embodiment of the present invention, which is viewed from the direction (i.e., the transverse direction of a liquid chamber) orthogonal to the direction in which the nozzles are aligned.

FIG. 14B is a cross-sectional view of a part of a modification example of the liquid discharging head according to the above-described seventh embodiment, which is viewed from the direction (i.e., the transverse direction of a liquid chamber) orthogonal to the direction in which the nozzles are aligned.

The modification example of the liquid discharging head according to the seventh embodiment and the liquid discharging head according to the seventh embodiment described above are almost the same in terms of configurations and functions. In the modification example, constituent elements that are the same as or correspond to constituent elements of the liquid discharging head according to the seventh embodiment are assigned the same reference signs as assigned to the constituent elements of the liquid discharging head according to the seventh embodiment, so as to omit explanation.

Furthermore, as clearly seen when comparing FIG. 14B with FIG. 2B, FIG. 4B or FIG. 10B, the modification example of the liquid discharging head according to the seventh embodiment and the modification examples of the liquid discharging heads according to the first embodiment, the second embodiment and the fifth embodiment described above are almost the same in terms of configurations of the channel plate 2.

Eighth Embodiment

Next, the following description explains a liquid discharging head according to the eighth embodiment of the present invention, with reference to FIG. 15A. FIG. 15A is a cross-sectional view of a part of an example of the liquid discharging head, which is viewed from the direction (i.e., the transverse direction of a liquid chamber) orthogonal to the direction in which the nozzles are aligned.

The eighth embodiment and, for example, the fifth embodiment described above with reference to FIG. 10A and FIGS. 11A through 11D are almost the same in terms of configurations and functions. The following description mainly explains parts that differ from the fifth embodiment, and explanations of parts that are the same as those in the fifth embodiment are omitted, as appropriate.

According to the embodiment 8, width of the second common liquid chamber member 122, which is between the first common liquid chamber member 121 and the third common liquid chamber member 123, is configured to be narrower than widths of the first common liquid chamber member 121 and the third common liquid chamber member 123, with respect to the direction (i.e., the transverse direction in FIG. 15A) orthogonal to the direction in which the nozzles are aligned.

Given such a configuration, ledge parts 146 are created between each of the first common liquid chamber member 121, the second common liquid chamber member 122, and the third common liquid chamber member 123. Therefore, similarly to the above-described seventh embodiment, adhesive agent 90 protruded in a joining process are accommodated by the ledge parts 146. Consequently, similarly to the seventh embodiment, the adhesive agent 90 is prevented from flowing into the common liquid chamber and then becoming solidified, which may cause bubbles to get trapped.

Note that width of the second common liquid chamber member 122 may be configured to be wider than widths of the first common liquid chamber member 121 and the third common liquid chamber member 123, with respect to the direction (i.e., the transverse direction in FIG. 15A) orthogonal to the direction in which the nozzles are aligned. Even in such a case, similarly to the above, ledge parts are created between each of the first common liquid chamber member 121, the second common liquid chamber member 122, and the third common liquid chamber member 123. Even in such a case, similarly to the above, adhesive agent 90 protruded in a joining process is accommodated by the ledge parts, such that the adhesive agent 90 is prevented from flowing into the common liquid chamber 10 and then becoming solidified, which may cause bubbles to get trapped.

Modification of the Eighth Embodiment

Next, the following description explains a modification example of the liquid discharging head according to the eighth embodiment.

Figure 15B:
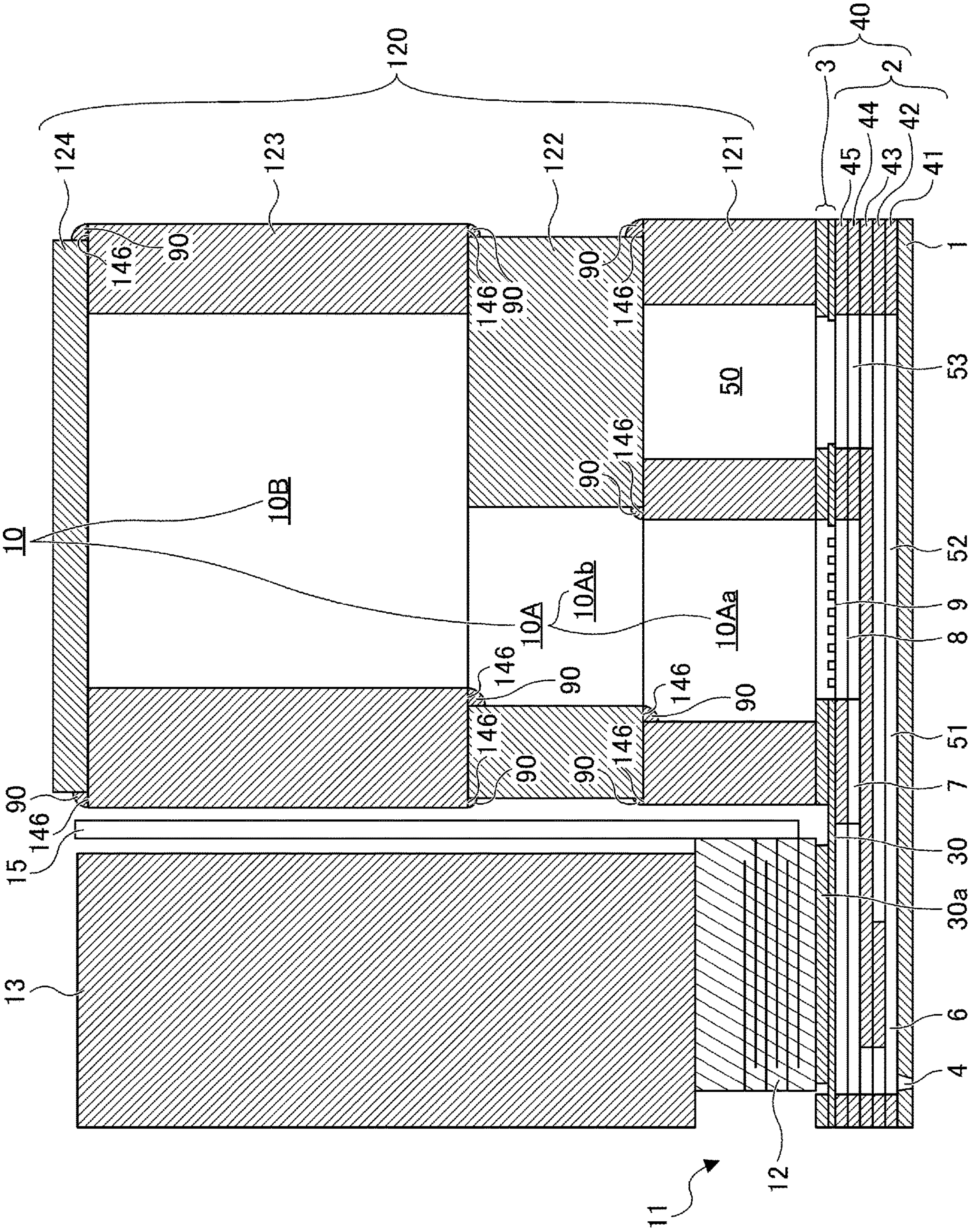
FIG. 15B is a cross-sectional view of a part of a modification example of the liquid discharging head according to the eighth embodiment of the present invention, which is viewed from the direction (i.e., the transverse direction of a liquid chamber) orthogonal to the direction in which the nozzles are aligned.

FIG. 15B is a cross-sectional view of a part of a modification example of the liquid discharging head according to the above-described eighth embodiment of the present invention, which is viewed from the direction (i.e., the transverse direction of a liquid chamber) orthogonal to the direction in which the nozzles are aligned.

The modification example of the liquid discharging head according to the eighth embodiment and the liquid discharging head according to the eighth embodiment described above have almost the same configurations and functions. In the modification example, constituent elements that are the same as or correspond to constituent elements of the liquid discharging head according to the eighth embodiment are assigned the same reference signs as assigned to the constituent elements of the liquid discharging head according to the eighth embodiment, so as to omit explanation.

Furthermore, as clearly seen when comparing FIG. 15B with FIG. 2B, FIG. 4B, FIG. 10B or FIG. 14B, the modification example of the liquid discharging head according to the eighth embodiment is almost the same as each modification example of the liquid discharging head according to the first embodiment, the second embodiment, the fifth embodiment or the seventh embodiment, in terms of configurations of the channel plate 2.

(Device for Discharging Liquid)

Figure 16:
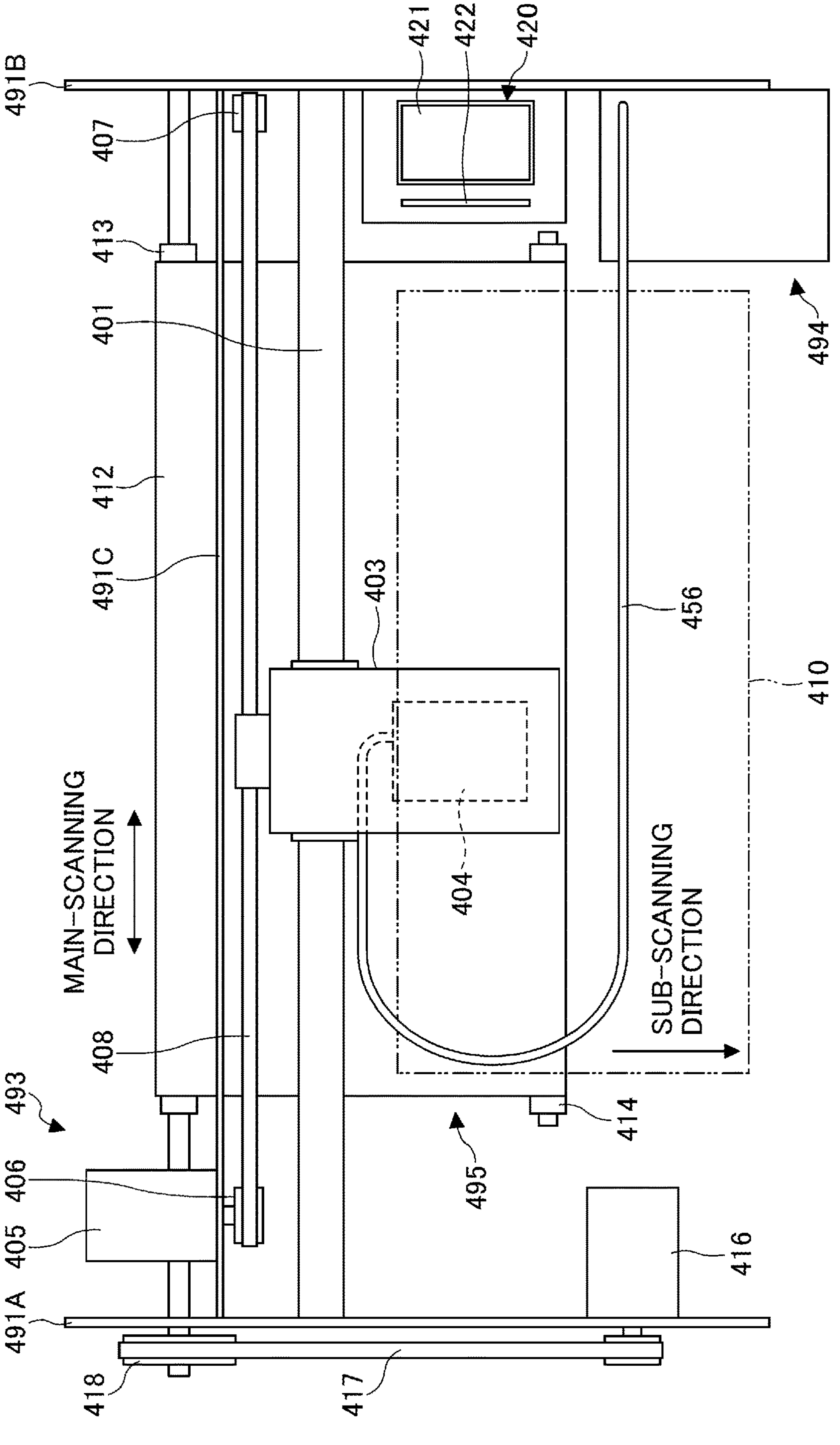
FIG. 16 is a plan view of a part of an example of a device for discharging liquid according to the first embodiment of the present invention.
Figure 17:
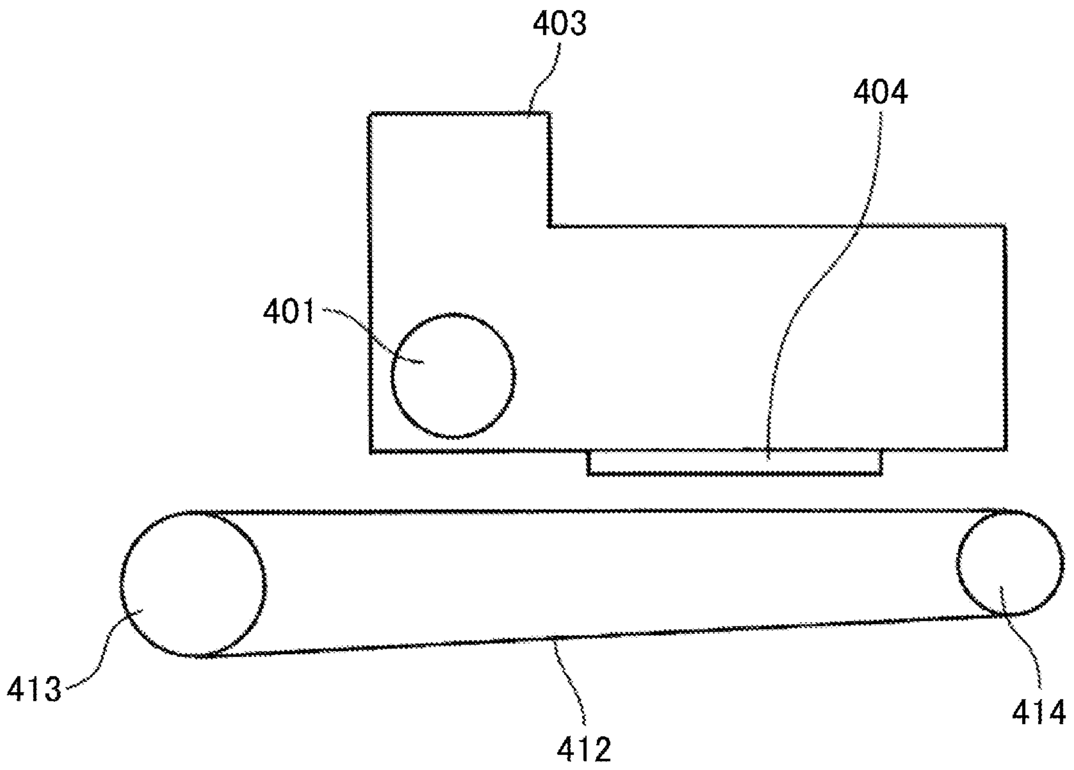
FIG. 17 is a side view of a part of the device for discharging liquid.

Next, the following description explains an example of the device for discharging liquid according to the first embodiment of the present invention, with reference to FIG. 16 and FIG. 17. FIG. 16 is a plan view of a part of the device for discharging liquid, and FIG. 17 is a side view of a part of the device for discharging liquid.

The device for discharging liquid is a serial type device in which a main-scanning movement mechanism 493 causes a carriage 403 to reciprocate in a main-scanning direction. The main-scanning movement mechanism 493 includes a guide member 401, a main-scanning motor 405, a timing belt 408, etc. The guide member 401 is disposed across right and left side plates 491A and 4915, to support the carriage 403 in a movable manner. Moreover, the main-scanning motor 405 enables the carriage 403 to reciprocate in the main-scanning direction via the timing belt 408 that extends over a driving pulley 406 and a driven pulley 407.

The above carriage 403 is mounted with a liquid discharging head 404 according to an embodiment or a modification example of the embodiment described above. The liquid discharging head 404 discharges liquid of respective colors of, for example, yellow (Y), cyan (C), magenta (M), and black (K). Furthermore, the liquid discharging head 404 is provided with a nozzle line that includes multiple nozzles aligning in a sub-scanning direction, which is orthogonal to the main-scanning direction; the multiple nozzles are installed on the liquid discharging head 404 with the discharging directions downwards.

There is a supply-circulation mechanism 494, which is described above with reference to FIG. 22, for supplying the liquid discharging head 404 with liquid stored outside the liquid discharging head 404. In the present example, every element included in the liquid circulation system described above with reference to FIG. 22, except for the liquid discharging head 404 (1002, in FIG. 22), belongs to the supply-circulation mechanism 494. Liquid is delivered from the supply-circulation mechanism 494 to the liquid discharging head 404 via a tube 456.

The device is provided with a conveyance mechanism 495 to convey a sheet 410. The conveyance mechanism 495 includes a conveyer belt 412 as a conveyance means and includes a sub-scanning motor 416 to drive the conveyer belt 412.

The conveyer belt 412 attracts and conveys the sheet 410 to a position that faces the liquid discharging head 404. The conveyer belt 412 is an endless belt that extends over a conveyance roller 413 and a tension roller 414. To attract, as mentioned above, electrostatic adsorption, air absorption, etc., may be employed.

The conveyer belt 412 performs circular movement in the sub-scanning direction as the sub-scanning motor 416 drives, via a timing belt 417 and a timing pulley 418, the conveyance roller 413 to rotate.

Furthermore, a maintenance/recovery mechanism 420 is arranged by the conveyer belt 412 near one of the ends of the main-scanning direction of the carriage 403, for conducting maintenance and recovery for the liquid discharging head 404.

The maintenance/recovery mechanism 420, for example, includes a cap member 421 for capping the nozzle surface (i.e., the surface having the nozzles 4) of the liquid discharging head 404 and includes a wiper member 422 for wiping the nozzle surface.

The main-scanning movement mechanism 493, the supply-circulation mechanism 494, the maintenance/recovery mechanism 420, and the conveyance mechanism 495 are disposed on a case including the side plates 491A and 491B and a back plate 491C.

In the device having such configurations as described above, a sheet 410 is fed onto and attracted by the conveyer belt 412 and is conveyed in the sub-scanning direction in accordance with circular movement of the conveyer belt 412.

Then, the liquid discharging head 404 is driven, based on an image signal, while the carriage 403 is moved in the main-scanning direction, so that liquid is discharged onto the sheet 410 to form an image when the sheet 410 is not moving.

As described above, provided with a liquid discharging head according to one of the embodiments or one of the modification examples of the embodiments described above, the device is capable of stably forming a high quality image.

(Liquid Discharging Unit)

Figure 18:
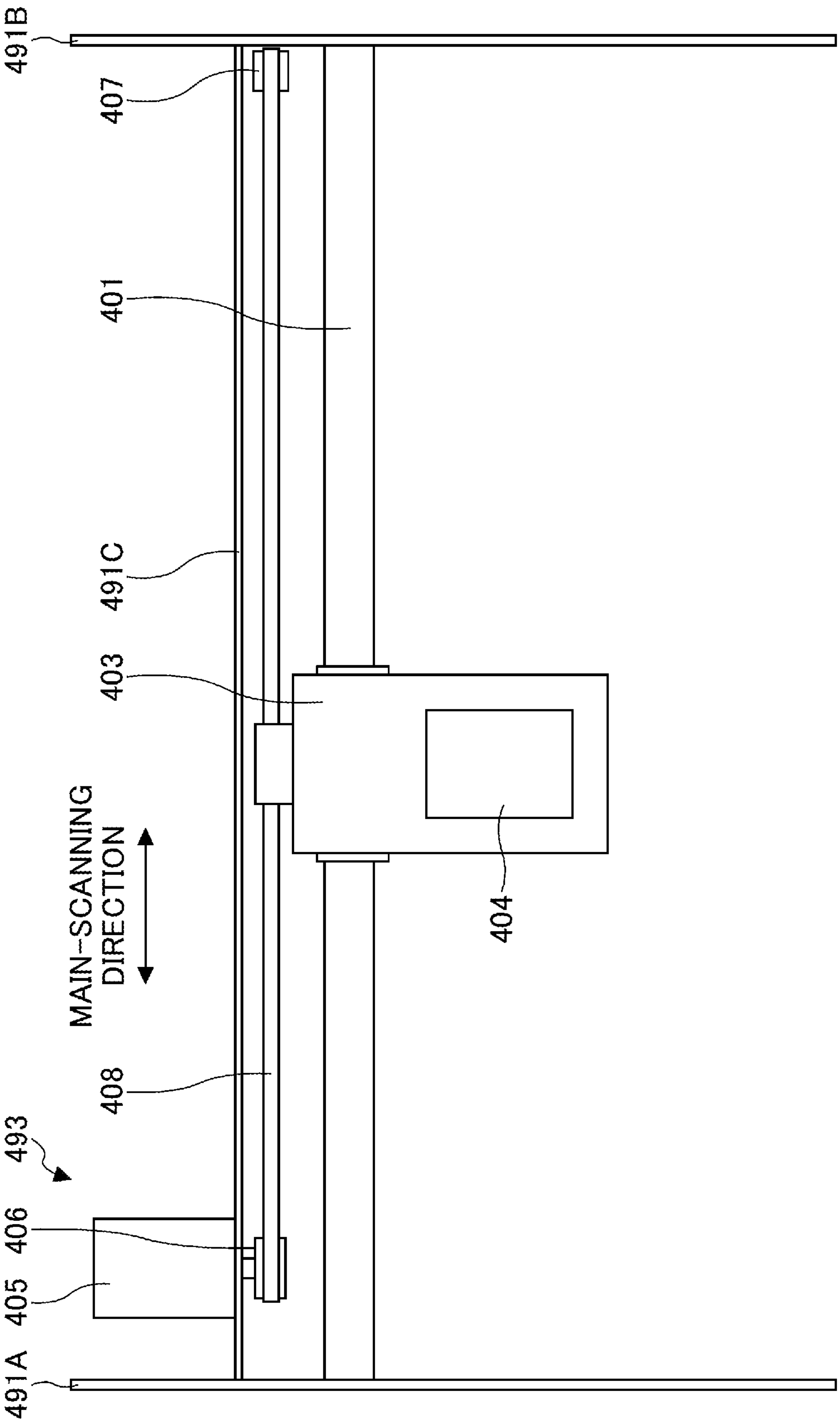
FIG. 18 is a plan view of a part of an example of a liquid discharging unit according to the first embodiment of the present invention.

Next, the following description explains the liquid discharging unit according to the embodiments of the present invention, with reference to FIG. 18. FIG. 18 is a plan view of a part of the unit.

Among the above-described constituent elements of the device for discharging liquid, the liquid discharging unit includes: the case part including the side plates 491A and 491B and the back plate 491C; the main-scanning movement mechanism 493; the carriage 403; and a liquid discharging head 404 according to an above-described embodiment or modification example of the embodiment.

Note that at least one of the above-described maintenance/recovery mechanism 420 and the supply-circulation mechanism 494 may be additionally mounted, for example, on the side plate 491B of the liquid discharging unit.

Figure 19:
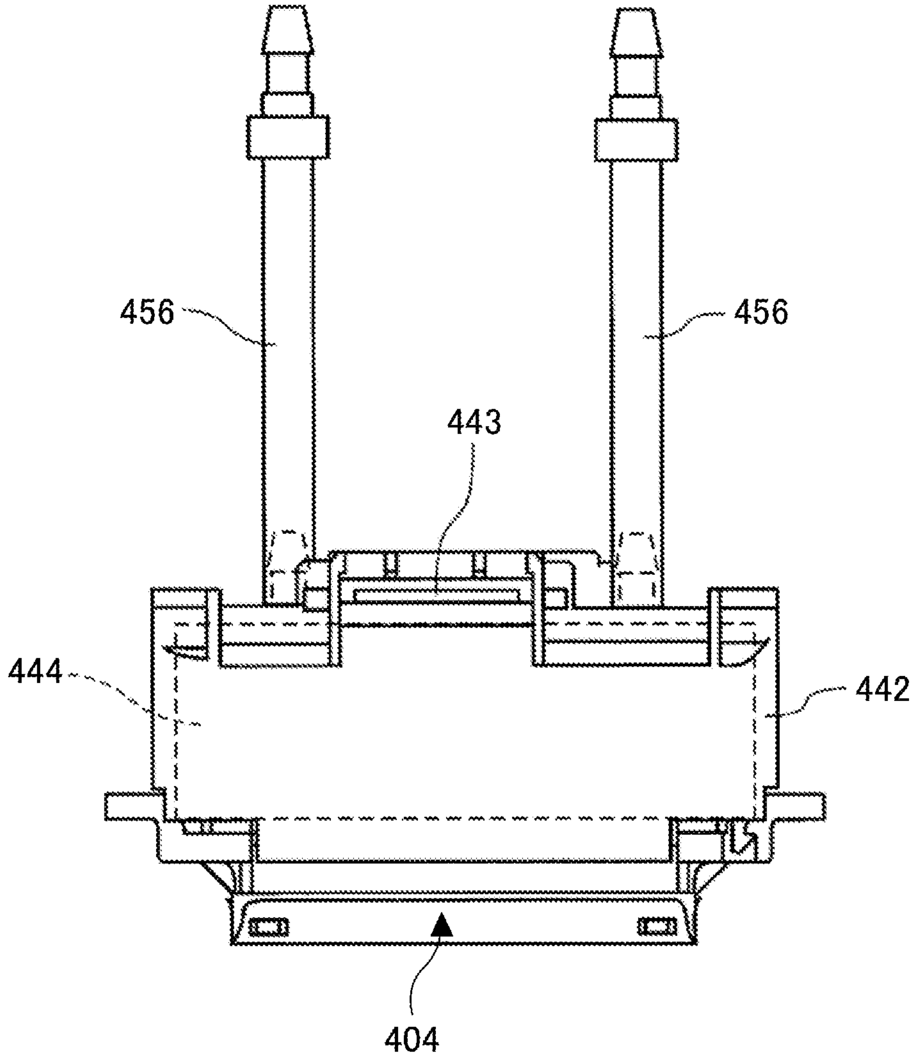
FIG. 19 is a plan view of a part of another example of the quid discharging unit according to the first embodiment of the present invention.

Next, the following description explains another example of a liquid discharging unit according to an embodiment of the present invention, with reference to FIG. 19. FIG. 19 is a front view of a part of the liquid discharging unit.

The liquid discharging unit includes a liquid discharging head 404 according to an embodiment or a modification example of the embodiment described above, which is provided with a channel part 444, and includes tubes 456 connected to the channel part 444.

Note that the channel part 444 is arranged inside a cover 442. Instead of the channel part 444, the supply-circulation mechanism 494 may be included. Furthermore, a connector 443 that enables electrical connection with the liquid discharging head 404 is provided on an upper portion of the channel part 444.

Note that, in the present application, the "device for discharging liquid" includes a liquid discharging head or a liquid discharging unit; the "device for discharging liquid" drives the liquid discharging head to discharge liquid. The "device for discharging liquid" is not limited to be a device that is capable of discharging liquid to something that liquid can adhere to; the "device for discharging liquid" may be a device for discharging liquid into gas or liquid fluid.

The "device for discharging liquid" may include means that relates to feeding, conveying, and ejecting something that liquid can adhere to, and moreover may include a pre-processing device, a post-processing device, etc.

For example, the "device for discharging liquid" may be an image forming device that discharges ink to form an image on a sheet, and may be a solid modeling device (i.e., a three-dimensional modeling device) that discharges modeling liquid to a powder layer formed of powdery material to produce a solid model (i.e., a three-dimensional model).

Furthermore, the "device for discharging liquid" is not limited to a device that discharges liquid for visualizing significative images such as letters and figures. For example, the "device for discharging liquid" may be a device that forms a pattern, etc., that is not significative by itself, and may be a device that produces a three dimensional model.

The above-mentioned "something that liquid can adhere to" means to be something that liquid can adhere to at least temporarily. Material of the "something that liquid can adhere to" may be anything such as paper, string, fiber, cloth, leather, metal, plastic, glass, wood, or ceramics, as far as being something that liquid can adhere to at least temporarily.

Furthermore, "liquid" may be ink, processing liquid, DNA samples, resists, pattern materials, binding agents, modeling liquid, etc.

Furthermore, unless otherwise specified, the "device for discharging liquid" may be a serial type device in which a liquid discharging head is moved, and may be a line type device in which a liquid discharging head is not moved.

Furthermore, various other devices may be the "device for discharging liquid". For example, the "device for discharging liquid" may be a processing liquid applying device that discharges processing liquid to a sheet to apply the processing liquid to the sheet surface for improving quality of the sheet surface, and may be a spray granulation device that sprays composition liquid containing raw materials dispersed inside of the liquid through a nozzle to granulate the raw materials into micro-particles.

The "liquid discharging unit" may be an assembly of parts related to discharging liquid, in which functional parts or mechanisms are unified with a liquid discharging head. For example, the "liquid discharging unit" may be a combination of a liquid discharging head and at least one of a carriage, a supply-circulation mechanism, a maintenance/recovery mechanism, and a main-scanning movement mechanism.

Note that "unified" may mean, for example, that a liquid discharging head and functional parts or mechanisms are fastened, adhered, engaged, etc., so as to be fixed to each other and that one is supported by the other in a movable manner. Moreover, a liquid discharging head and functional parts or mechanisms may be configured to be attachable to or detachable from each other.

For example, the liquid discharging unit may be a unit in which a liquid discharging head and a supply-circulation mechanism are unified. Furthermore, the liquid discharging unit may be a unit in which a liquid discharging head and a supply-circulation mechanism are unified through tubes, etc., that connect each other. Note that such a liquid discharging unit may be additionally provided with a unit including a filter disposed between a liquid discharging head and a supply-circulation mechanism.

Furthermore, the liquid discharging unit may be a unit in which a liquid discharging head and a carriage are unified.

Furthermore, the liquid discharging unit may be a unit in which a liquid discharging head is unified with a main-scanning movement mechanism, such that the liquid discharging head is supported in a movable manner by a guide member that is configured to be a part of the main-scanning movement mechanism. Furthermore, as illustrated in FIG. 18, the liquid discharging unit may be a unit in which a liquid discharging head, a carriage, and a main-scanning movement mechanism are unified.

Furthermore, the liquid discharging unit may be a unit in which a liquid discharging head, a carriage, and a maintenance/recovery mechanism are unified, such that a cap member that is a part of the maintenance/recovery mechanism is fixed to the carriage that is provided with the liquid discharging head.

Furthermore, as illustrated in FIG. 19, the liquid discharging unit may be a unit in which a liquid discharging head is unified with a supply-circulation mechanism or a channel part, such that tubes are connected to the liquid discharging head, which is provided with the supply-circulation mechanism or the channel part.

The main-scanning movement mechanism may be simply a guide member. Furthermore, a supply-circulation mechanism may be simply tubes or a loading unit.

Furthermore, there is no specific limitation regarding the pressure Generating unit employed for the "liquid discharging head". For example, besides the piezoelectric actuator (which may be a multilayer piezoelectric element) as explained in the above embodiments or the modification examples of the embodiments, the pressure generating unit may be a thermal actuator provided with an electricity-heat converting element such as a heating resistor and may be an electrostatic actuator configured with a diaphragm and a counterpart electrode.

Furthermore, among the terms of the present application, terms such as image forming, recording, letter printing, photo printing, printing, and modeling are considered to be synonyms.

Although the present invention is explained by the above description along with embodiments or modifications of the embodiments, the present invention is not limited to the above embodiments and modifications of the embodiments, and variations and further modifications may be made without departing from the scope of the present invention. For example, combinations or replacements of constituent elements may be made in the above described embodiments and modifications of the embodiments.

What is claimed is:

1. A liquid discharging head comprising:

a nozzle plate having a plurality of nozzles from which liquid is discharged;

a channel member including a plurality of individual liquid chambers that are communicably connected to the plurality of nozzles, respectively; and a common liquid chamber member for forming a common liquid chamber that supplies liquid to the plurality of individual liquid chambers and for forming a circulation common liquid chamber, wherein the common liquid chamber and the circulation common liquid chamber are both arranged on the same side with respect to the nozzles, in a direction orthogonal to both a direction in which liquid is discharged from the nozzles and a direction in which the nozzles are aligned, and the common liquid chamber member is joined to the channel member.

2. The liquid discharging head according to claim 1, wherein the circulation common liquid chamber and a part of the common liquid chamber are arranged side by side in the direction orthogonal to both the direction in which liquid is discharged from the nozzles and the direction in which the nozzles are aligned.

3. The liquid discharging head according to claim 1, wherein the circulation common liquid chamber occupies a part of space in the common liquid chamber member.

4. The liquid discharging head according to claim 3, wherein the circulation common liquid chamber is covered by the common liquid chamber from a surface opposite to the direction in which liquid is discharged from the nozzles and from one of surfaces facing the direction orthogonal to both the direction in which liquid is discharged from the nozzles and the direction in which the nozzles are aligned.

5. The liquid discharging head according to claim 1, wherein each of the common liquid chamber and the circulation common liquid chamber has liquid ports on both ends in the direction in which the nozzles are aligned.

6. The liquid discharging head according to claim 1, wherein the common liquid chamber member includes at least three members that are consecutively layered in the direction in which liquid is discharged from the nozzles, wherein, among the three members, one of two members arranged in series in a direction of layering has a through-part to become a part of the common liquid chamber and has a through-part to become the circulation common liquid chamber, and wherein another one of the two members is provided to form a wall part of the circulation common liquid chamber and has a through-part to become another part of the common liquid chamber.

7. The liquid discharging head according to claim 1, wherein the common liquid chamber member includes at least three members that are consecutively layered in the direction in which liquid is discharged from the nozzles, and wherein a ledge part is formed at each joint part of the at least three members that are consecutively layered.

8. The liquid discharging head according to claim 7, wherein the ledge part formed at each joint part of the at least three members that are consecutively layered is formed due to deformation that is made in press processing to form the at least three members that are layered.

9. The liquid discharging head according to claim 7, wherein the ledge part formed at each joint part of the at least three members that are consecutively layered is formed due to dimensional gaps between the at least three members that are layered.

10. A liquid discharging unit comprising:

the liquid discharging head according to claim 1.

11. A device for discharging liquid, the device comprising:

the liquid discharging unit according to claim 10.

12. A device for discharging liquid, the device comprising:

the liquid discharging head according to claim 1.

13. The liquid discharging head according to claim 1, wherein the common liquid chamber member includes a space configured to accommodate a piezoelectric member.

14. The liquid discharging head according to claim 13, wherein the common liquid chamber is disposed within the common liquid chamber member nearer to the space than the circulation common liquid chamber is, in the direction orthogonal to both the direction in which liquid is discharged from the nozzles and the direction in which the nozzles are aligned.

15. The liquid discharging head according to claim 13, wherein the common liquid chamber, the circulation common liquid chamber, and the space are arranged parallel to each other, extending in the direction in which the nozzles are aligned.

16. The liquid discharging head according to claim 13, wherein at least two of each of the common liquid chamber and the circulation common liquid chamber are provided facing each other on opposite sides of the space.

17. The liquid discharging head according to claim 1, wherein a part of the common liquid chamber overlaps the circulation common liquid chamber from the direction in which liquid is discharged from the nozzles, and another part of the common liquid chamber overlaps the circulation common liquid chamber from the direction orthogonal to both the direction in which liquid is discharged from the nozzles and the direction in which the nozzles are aligned.

18. A liquid discharging head comprising:

a nozzle plate having a plurality of nozzles from which liquid is discharged;

a channel member including a plurality of individual liquid chambers that are communicably connected to the plurality of nozzles, respectively; and a common liquid chamber member for forming a common liquid chamber that supplies liquid to the plurality of individual liquid chambers and for forming a circulation common liquid chamber, wherein the common liquid chamber and the circulation common liquid chamber are both arranged on the same side with respect to the nozzles, in a longitudinal direction of the plurality of individual liquid chambers.

* * * * *